United States Patent
You et al.

(10) Patent No.: US 8,954,299 B2
(45) Date of Patent: Feb. 10, 2015

(54) METHOD OF ANTHROPOMETRIC PRODUCT DESIGN AND MEDIA THAT CAN RECORD COMPUTER PROGRAM FOR METHOD THE SAME

(75) Inventors: Hee-Cheon You, Gyeongsangbuk-Do (KR); Ki-Hyo Jung, Gyeongsangbuk-Do (KR); Won-Sup Lee, Gyeongsangbuk-Do (KR); Jang-Woon Park, Ulsan-Si (KR); Byung-Gil Kang, Gyeongsangbuk-Do (KR); Joung-Hyo Lee, Gyeongsangbuk-Do (KR); Joo-Ho Uem, Gyeongsangbuk-Do (KR); Sei-Kwon Park, Chungcheongbuk-Do (KR)

(73) Assignee: Korea Aerospace Industries, Ltd. (KR)

( * ) Notice: Subject to any disclaimer, the term of this patent is extended or adjusted under 35 U.S.C. 154(b) by 925 days.

(21) Appl. No.: 12/616,886

(22) Filed: Nov. 12, 2009

(65) Prior Publication Data
US 2010/0138194 A1 Jun. 3, 2010

(30) Foreign Application Priority Data
Dec. 1, 2008 (KR) .................. 10-2008-0120733

(51) Int. Cl.
*G06F 17/50* (2006.01)
*G06F 7/60* (2006.01)
(Continued)

(52) U.S. Cl.
CPC ............ *G06F 17/50* (2013.01); *G06F 17/5095* (2013.01); *G06F 17/5004* (2013.01); *G06F 17/5086* (2013.01); *G06F 17/5009* (2013.01); *G06F 2217/08* (2013.01)
USPC .............................. 703/2; 703/1; 703/6; 703/7

(58) Field of Classification Search
CPC . G06F 17/50; G06F 17/5009; G06F 17/5004; G06F 17/5086; G06F 17/5095
USPC ................................................ 703/1, 2, 6, 7
See application file for complete search history.

(56) References Cited

U.S. PATENT DOCUMENTS 7,797,138 B2 * 9/2010 Reynolds et al. ................. 703/1
2002/0016700 A1 * 2/2002 Furusu et al. ..................... 703/6
(Continued)

OTHER PUBLICATIONS

Libo Zhang, NPL Publication "Design and Implementation of Ergonomics Evaluation System of 3D Airplane Cockpit", Aug. 2007.*
(Continued)

*Primary Examiner* — Omar Fernandez Rivas
*Assistant Examiner* — Angel Calle
(74) *Attorney, Agent, or Firm* — Ostrolenk Faber LLP

(57) ABSTRACT

Provided are an anthropometric product design method and a recording media storing a computer program for the same. The anthropometric product design method includes the operations of: (a) expressing the relationships between human body variables and design variables in equations, and establishing design equations for design variables, respectively, of a product to be designed; (b) generating a representative human model (RHM) for the product to be designed; (c) extrapolating postures according to changes in design dimensions through a computer simulation using the design equations and RHMs, and comparing data on the extrapolated postures with defined reference posture data to perform a design sensitivity analysis; and (d) determining optimal design dimensions for related design variables based on the design sensitivity analysis. Accordingly, because various human body dimensions and product use postures of users can be reflected in product designs through computer simulation, products that are better customized for users can be designed, and products can be designed that are optimized through design sensitivity analyzes of posture loss scores according to changes in design dimensions.

21 Claims, 22 Drawing Sheets

| Design Variable | Body Dimension | | | Posture Dimension | |
|---|---|---|---|---|---|
| | Upper Leg Length | Lower Leg Length | Hip Breadth | Hip Flexion Angle | Knee Flexion Angle |
| | BD1 | BD2 | BD3 | PD1 | PD2 |
| Seat Height | O | O | | O | O |
| Seat Depth | O | | | | O |
| Seat Width | | | O | | |

(51) Int. Cl.
*G06F 17/10* (2006.01)
*G06G 7/48* (2006.01)

(56) References Cited

U.S. PATENT DOCUMENTS

2003/0018454 A1* 1/2003 Winkler et al. .............. 703/1
2010/0030532 A1* 2/2010 Arora et al. ................. 703/2

OTHER PUBLICATIONS

Jingzhou Yang, NPL publication "Multi-objective Optimization for Upper Body Posture Prediction", 2004.*
Vector Addition, "Vector addition: Component Method", 2002, http://webphysics.davidson.edu/physlet_resources/bu_semester1/c3_vadd_comp.html.*
S. Thorley, "Applied ergonomics for operator compartment design in an EJC 88 XLP loader", Jan. 2006.*
Martin Baumruk, "Human factor and ergonomic simulation",2006.*
Kimberly Farrell, "Kinematic human modeling and simulation using optimization based posture prediction", Dec. 2005.*
ANSI/HFES 100-2007, "Human Factors Engineering of Computer Workstation." Human Factors and Ergonomics Society, Santa Monica, CA, pp. 73-90.
Das, Biman and Sengupta, Arijit K.: "Industrial workstation design: A systematic ergonomics approach." 1996 Applied Ergonomics, 27(3), pp. 157-163.

* cited by examiner

FIG. 3

| Design Variable | Body Dimension | | | Posture Dimension | |
| --- | --- | --- | --- | --- | --- |
| | Upper Leg Length BD1 | Lower Leg Length BD2 | Hip Breadth BD3 | Hip Flexion Angle PD1 | Knee Flexion Angle PD2 |
| Seat Height | ○ | ○ | | ○ | ○ |
| Seat Depth | ○ | | | | ○ |
| Seat Width | | | ○ | | |

METHOD OF ANTHROPOMETRIC PRODUCT DESIGN AND MEDIA THAT CAN RECORD COMPUTER PROGRAM FOR METHOD THE SAME

CROSS-REFERENCE TO RELATED PATENT APPLICATION

This application claims the benefit of Korean Patent Application No. 10-2008-0120733, filed on Dec. 1, 2008, in the Korean Intellectual Property Office, the disclosure of which is incorporated herein in its entirety by reference.

BACKGROUND OF THE INVENTION

1. Field of the Invention

The present invention relates to an anthropometric product design method and a recording media storing a computer program for the same, and more particularly, to an anthropometric product design method, which employs design sensitivity analysis, and a recording media storing a computer program for the same.

2. Description of the Related Art

Anthropometric product design methods using the anthropometric data of target population groups are employed to develop user-centered product designs. ANSI/HFES (2007. Human Factors Engineering of Computer Workstations. Santa Monica, Calif.: Human Factors and Ergonomics Society) has developed a computer workstation design standard using design equations that formulate the geometric relationships between design variables and anthropometric variables, and Das and Sengupta (1996. Das, B., and Sengupta, A. K. Industrial workstation design: a systematic ergonomics approach. *Applied Ergonomics,* 27(3), 157-163.) designed workstations and workspaces by applying anthropometric data of design target populations.

While conventional anthropometric product design methods are useful for user-centered product design, they are required to supplement two aspects (designs accommodating posture diversity and design optimization) for better product design for the users.

First, posture diversity of users must be taken into account in designing products. The conventional design methods determine product design dimensions based on a single reference posture designated by a designer. Referring to the example of FIG. 1A, the height (h) of the pilot seat is designed based on a reference leg posture (90°). However, a product use posture may be varied according to product use characteristics and user posture preferences, as shown in FIG. 1B, and therefore user posture diversity must be considered to product designs.

Second, design optimization is required to provide comfortable product use postures for users. Product design dimensions must be optimally designed to provide a comfortable product use posture for the target population for whom the product is designed. For design optimization, design sensitivity analysis that quantifies levels of user posture discomfort according to modifications of design dimensions is required. Through the design sensitivity analysis, optimal designs that minimize user posture discomfort can be determined.

Meanwhile, a search of the related art shows that there are no cases that have developed systems to support anthropometric product design through systematic design sensitivity analysis.

SUMMARY OF THE INVENTION

The present invention provides an anthropometric product design method, which designs anthropometric products suitable for users by performing design sensitivity analysis after running a computer simulation of postures according to modifications of product design dimensions, and a recording media storing a computer program for the same.

In addition, the present invention provides an anthropometric product design method capable of incorporating various posture characteristics into product design in accordance with human body characteristics of users having various human body sizes and product use, and a recording media storing a computer program for the same.

Furthermore, the present invention provides an anthropometric product design method capable of optimizing designs by analyzing posture loss scores of users according to modifications of product design dimensions and incorporating the analysis result into the product design, and a recording media storing a computer program for the same.

Moreover, the present invention provides an anthropometric product design method, which designs anthropometric products suitable for users by performing design sensitivity analysis through computer simulation of cyclic, collective, pedal, and other control components when designing pilot seats (driver seats) of aircraft, helicopters, automobiles, etc., and a recording media storing a computer program for the same.

According to an aspect of the present invention, an anthropometric product design method includes: (a) expressing the relationships between human body variables and design variables in equations and establishing design equations for design variables for a product to be designed; (b) generating a group of representative human models (RHMs) for the product to be designed; (c) estimating postures according to changes in design dimensions through a computer simulation using design equations and RHMs and comparing data on the estimated postures with defined reference posture data to perform a design sensitivity analysis; and (d) determining optimal design dimensions for related design variables based on the design sensitivity analysis.

The establishment of design equations in operation (a) may include performing a design structure matrix analysis to analyze the relationships between human body variables and design variables.

Human body variables may include human body part variables and posture variables.

The generation of RHMs (b) may include generating at least one person demographically representative of a target population.

The estimation of postures according to changes in the design dimensions in operation (c) may include estimating postures of the RHM for the product to be designed, through running a simulation in which the dimensions of the product are changed within a designable range while substituting human body dimensions of the RHM into the design equations.

The execution of the design sensitivity analysis in operation (c) may include comparing the estimated posture data with the defined reference posture data to calculate a posture loss score, and performing the design sensitivity analysis based on the calculated posture loss score.

The calculation of the posture loss score in operation (c) may include substituting the estimated posture data in a posture loss function that converts the posture of the RHM to a posture loss score, and performing a calculation.

The posture loss function may satisfy the expression, posture threshold×|RHM posture−reference posture|.

The posture loss function may have a comparatively smaller slope within a defined reference posture threshold range, and may have a comparatively greater slope outside the defined reference posture threshold range.

The determination of the optimal design dimensions in operation (d) may include determining a loss score of the RHM that is a minimum value, based on the design sensitivity analysis, as optimal design dimensions of related design variables.

A design equation for the vertical height (DD6) from the seat reference point (SRP) to the floor may be 'DD6=BD1×sin(AD1)−BD2×sin(seatpan angle)+25', where BD1 is the height from the floor to the popliteus, AD1 is a knee flexion angle, BD2 is the length from the buttock to the popliteus, the seatpan angle ranges from 10° to 20°, and 25 is a heel height in millimeter (mm).

A design equation for the y-axis horizontal distance (DD2) from the design eye point (DEP) to the neutral seat reference point (NSRP) may be 'DD2=110−BD3×sin(AD3)+(BD4−BD3)×sin(AD4)+BD9', where 110 is the horizontal distance (mm) between the NSRP and the heel point (HP), BD3 is an acromial height from an SRP to shoulder, AD3 is a seatback angle, BD4 is the eye height from the SRP to the eye, AD4 is a neck flexion angle, and BD9 is the distance between the eye and the body centerline.

A design equation for the vertical distance (DD3) from the DEP to the floor may be 'DD3=DD6+BD3×cos(AD3)+(BD4−BD3)×cos(AD4)', where DD6 is the vertical height from the SRP to the floor, BD3 is the height from the SRP to the shoulder, AD3 is a seatback angle, BD4 is the eye height from the SRP to the eye, and AD4 is a neck flexion angle.

A design equation for the horizontal adjustment range of the pilot seat (DD7) may be 'DD7=110−{DD2−(BD4−BD3)×sin(AD4)+BD3×sin(AD3)}+BD9', where 110 is the horizontal distance (mm) from the NSRP to the HP, DD2 is the y-axis horizontal distance from the DEP to the NSRP, BD4 is the eye height from the SRP to the eye, BD3 is the acromial height from the SRP to the shoulder, AD3 is a seatback angle, and BD9 is the distance between the eye and the body centerline.

A design equation for the vertical adjustment range of the pilot seat (DD8) may be 'DD8=DD3−(BD4−BD3)×cos(AD4)−BD3×cos(AD3)−DD6', where DD3 is the vertical distance from the DEP to the floor, BD4 is the eye height from the SRP to the eye, BD3 is the acromial height from the SRP to the shoulder, AD4 is a neck flexion angle, AD3 is a seatback angle, and DD6 is the vertical height from the SRP to the floor.

A design equation for the y-axis horizontal distance (DD10) from the cyclic control to the NSRP may be 'DD10=DD2−BD9−(BD4−BD3)×sin(AD4)+BD5×sin(AD6)+BD6×cos(AD9)×cos(AD8+AD6)×cos(AD9)', where DD2 is the y-axis horizontal distance from the DEP to the NSRP, BD9 is the distance between the eye and the body centerline, BD4 is the eye height from the SRP to the eye, BD3 is the acromial height from the SRP to the shoulder, AD4 is a neck flexion angle, BD5 is the upper arm length, AD6 is a shoulder flexion angle, BD6 is the length between elbow and the hand, AD9 is a shoulder rotation angle, and AD8 is an elbow flexion angle.

A design equation for the vertical distance (DD11) from the cyclic control to the floor may be 'DD11=DD3−(BD4−BD3)×cos(AD4)−BD5×cos(AD6)×cos(AD7)−BD6×cos(AD8+AD6)', where DD3 is the vertical distance from the DEP to the floor, BD4 is the eye height from the SRP to the eye, BD3 is the acromial height from the SRP to the shoulder, AD4 is a neck flexion angle, BD5 is the upper arm length, AD6 is a shoulder flexion angle, AD7 is a shoulder abduction angle, BD6 is the length between the elbow and the hand, and AD8 is an elbow flexion angle.

A design equation for an x-axis horizontal distance (DD13) from the collective control to the DEP may be 'DD13=BD7/2+BD5×sin(AD7)−BD6×sin(AD9)', where BD7 is the biacromial breadth, BD5 is the upper arm length, AD7 is a shoulder abduction angle, BD6 is the elbow-to-hand length, and AD9 is a shoulder rotation angle.

A design equation for the y-axis horizontal distance (DD14) from the collective control to the DEP may be 'DD14=DD2−BD9−(BD4−BD3)×sin(AD4)+BD5×sin(AD6)+BD6×cos(AD8+AD6)×cos(AD9)', where DD2 is the y-axis horizontal distance from the DEP to a side, BD9 is the distance between the eye and the body centerline, BD4 is the eye height from the SRP to the eye, BD3 is the acromial height from the SRP to the shoulder, AD4 is a neck flexion angle, BD5 is the upper arm length, AD6 is a shoulder flexion angle, BD6 is the length between the elbow and the hand, AD8 is an elbow flexion angle, and AD9 is a shoulder rotation angle.

A design equation for the vertical distance (DD15) from the collective control to the DEP may be 'DD15=DD3−(BD4−BD3)×cos(AD4)−BD5×cos(AD6)×cos(AD7)−BD6×cos(AD8+AD6)', where DD3 is the vertical distance from the DEP to the floor, BD4 is the eye height from an SRP to the eye, BD3 is the acromial height from the SRP to the shoulder, AD4 is a neck flexion angle, BD5 is the upper arm length, AD6 is a shoulder flexion angle, AD7 is a shoulder abduction angle, BD6 is the elbow-to-hand length, and AD8 is an elbow flexion angle.

A design equation for an x-axis horizontal distance (DD17) from the yaw pedal to the DEP may be 'DD17=DD1+BD11/2+BD2×sin(AD2)×sin(AD10)+(BD1+2.5)×sin(AD1)×sin(AD10)', here DD1 is the y-axis horizontal distance from the DEP to the NSRP, BD11 is the hip pivot width, BD2 is the length from the buttock to the popliteus, AD2 is a hip flexion angle, AD10 is a hip abduction angle, BD1 is the height from the floor to the popliteus, and AD1 is a knee flexion angle.

A design equation for the y-axis horizontal distance (DD14) from the yaw pedal to the NSRP may be 'DD14=DD2−BD9−(BD4−BD3)×sin(AD4)+BD3×sin(AD3)+BD2×cos(AD2)×cos(AD10)+(BD1+2.5)×cos(AD1)×cos(AD2)+BD10', where DD2 is the y-axis horizontal distance from the DEP to the NSRP, BD9 is the distance between the eye to the body centerline, BD4 is the eye height from an SRP to the eye, BD3 is the acromial height from the SRP to the shoulder, AD4 is a neck flexion angle, AD3 is a seatback angle, BD2 is the length from the buttock to the popliteus, AD2 is a hip flexion angle, AD10 is a hip abduction angle, BD1 is the height from the floor to the popliteus, AD1 is a knee flexion angle, and BD10 is the distance between the ankle and the ball-of-foot.

A design equation for the z-axis vertical distance from the yaw pedal to the floor may be 'DD6+BD2×sin(AD2)−BD1×sin(AD1)+BD10×sin(AD12)+2.5', where DD6 is the z-axis vertical distance from the floor to the NSRP, BD2 is the length from the buttock to the popliteus, AD2 is a hip flexion angle, BD1 is the height from the floor to the popliteus, AD1 is a knee flexion angle, BD10 is the distance between the ankle to the ball-of-foot, and AD12 is an ankle flexion angle.

According to another aspect of the present invention, provided is a recording media storing a computer program for the above anthropometric product design method.

BRIEF DESCRIPTION OF THE DRAWINGS

The above and other features and advantages of the present invention will become more apparent by describing in detail exemplary embodiments thereof with reference to the attached drawings in which:

FIG. 3 is a table showing a design structure matrix analysis for designing a pilot seat;

FIG. 6 is a drawing showing the origin of global coordinates, FIG. 7 is a reference drawing for obtaining a design equation for the horizontal height from the seat reference point (SRP) to the floor, FIG. 8 is a reference drawing for obtaining a design equation for the y-axis horizontal distance from the design eye point (DEP) to the neutral seat reference point (NSRP), FIG. 9 is a reference drawing for obtaining a design equation for the vertical distance from the DEP to the floor, FIG. 10 is an exemplary drawing for obtaining a design equation for the horizontal adjustment range of the pilot seat, FIG. 11 is an exemplary drawing for obtaining a design equation for the vertical adjustment range of the pilot seat, FIG. 12 is an exemplary drawing for obtaining a design equation for the horizontal distance of the y-axis from the cyclic control to the NSRP, FIGS. 13 and 14 are exemplary drawings for obtaining a design equation for the vertical distance from the cyclic control to the floor, FIG. 15 is an exemplary drawing for obtaining a design equation for the horizontal distance of an x-axis from the collective control to the DEP, FIG. 16 is an exemplary drawing for obtaining a design equation for the horizontal distance of the y-axis from the collective control to the DEP, FIG. 17 is an exemplary drawing for obtaining a design equation for the vertical distance from the collective control to the DEP, FIGS. 18 and 19 are exemplary drawings for obtaining a design equation for the horizontal distance of an x-axis from the yaw pedal to the DEP, FIG. 20 is an exemplary drawing for obtaining a design equation for the horizontal distance of the y-axis from the yaw pedal to the NSRP, and FIG. 21 is an exemplary drawing for obtaining a design equation for the vertical distance of the z-axis from the yaw pedal to the floor.

DETAILED DESCRIPTION OF THE INVENTION

The present invention will now be described more fully with reference to the accompanying drawings, in which exemplary embodiments of the invention are shown. In describing embodiments of the present invention, the same reference numbers will be used to refer to elements having the same functions and operations.

Embodiment

Figure 1A:
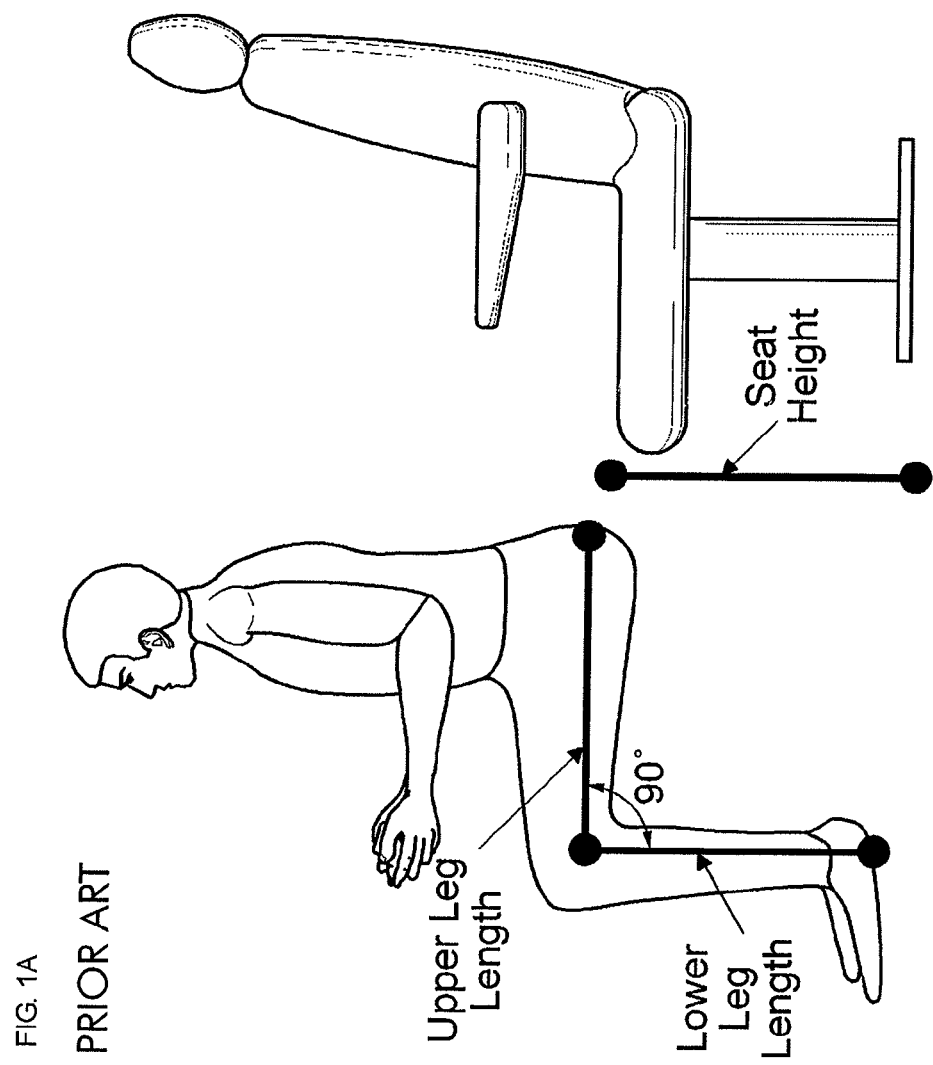
FIG. 1A is a drawing showing a reference posture in a height design of a pilot seat.
Figure 1B:
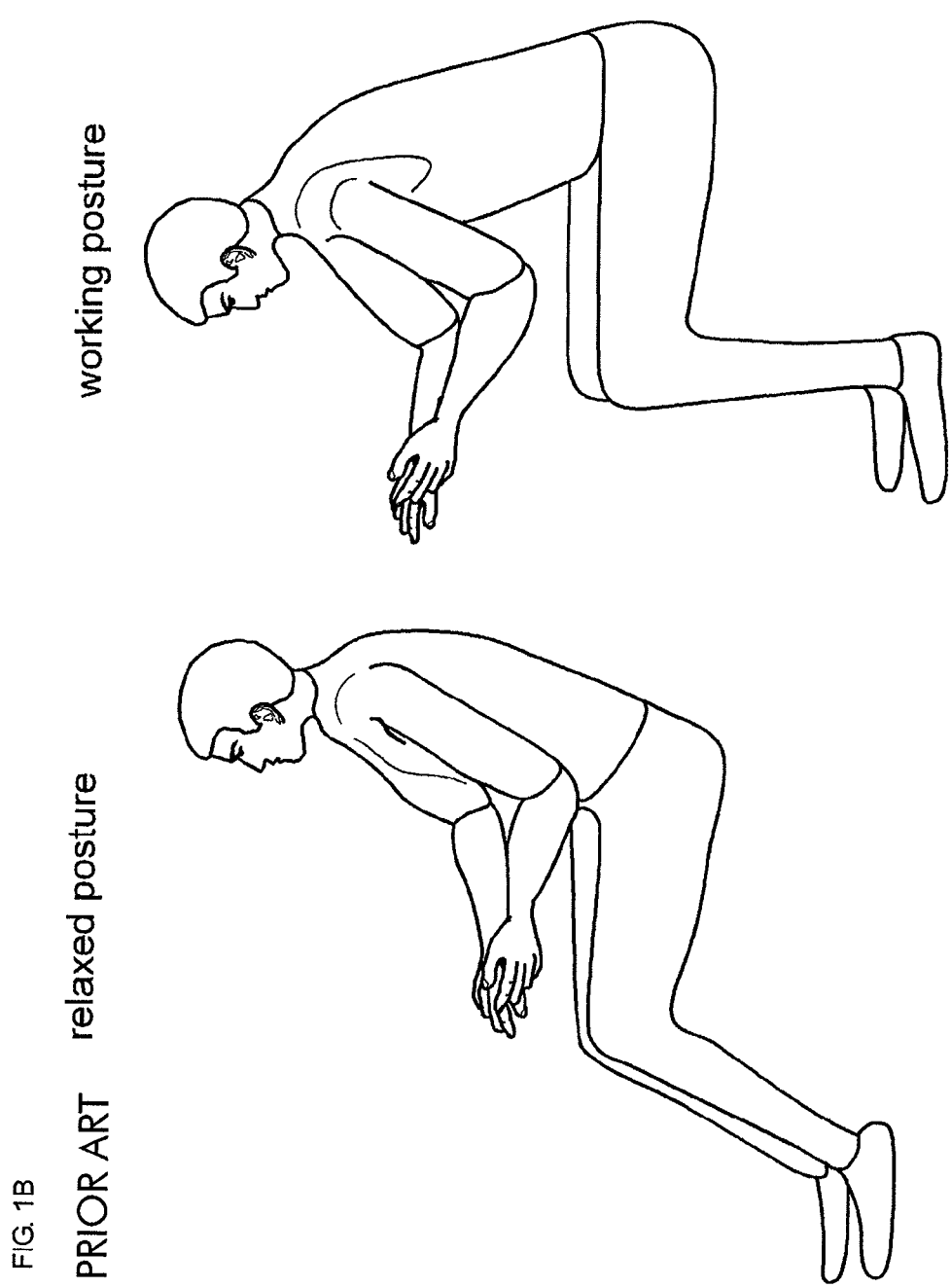
FIG. 1B is a drawing showing examples of sitting postures in a pilot seat.
Figure 2:
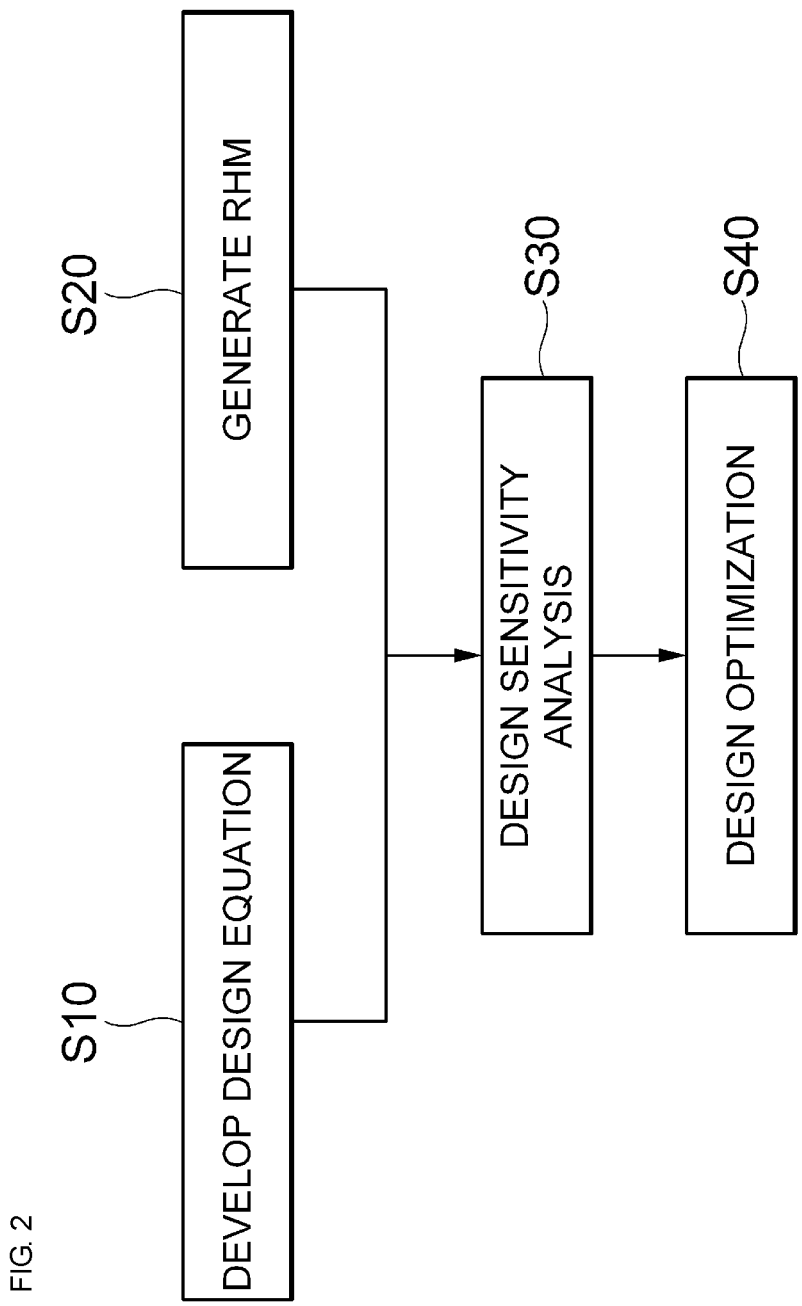
FIG. 2 is an operational flowchart showing an anthropometric product design method according to a preferred embodiment of the present invention.

FIG. 2 is an operational flowchart showing an anthropometric product design method according to an embodiment of the present invention.

First, in operation S10, a design equation is established for each design variable of a product to be designed by expressing the relationship between human body variables and design variables in equations.

Here, the design equations are equations that express the geometric relationship between design variables and human body variables. Some design equations for design variables include human body variables that must be considered when determining design variable dimensions, and the size of design variable dimensions can be easily determined through substitution of human body variable dimensions of a representative human model (RHM) into a design equation. Such design equations may be developed by determining human body variables related to design variables through a design structure matrix (DSM) analytic table shown in FIG. 3, and then expressing the related human body variables.

Development of design equations through DSM analysis is performed through schematizing the relationships between design variables and human body variables in a table such as that in FIG. 3, and then expressing the human body variables relating to each design variable in an equation.

Referring to FIG. 3, because the design dimensions for the distance of the pilot seat are related to the leg length (upper leg length and lower leg length) of an RHM and the leg posture (angle at the buttock and angle at the knee) when seated in the pilot seat, when the human body variables are expressed in an equation, a design equation may be expressed as: "pilot seat height=BD1×sin(PD1)−BD2×sin(PD2)", where BD1 represents the upper leg length, PD1 represents an angle at the buttock, BD2 represents the lower leg length, and PD2 represents an angle at the knee.

Also, because the design dimensions for the depth of the pilot seat are related to the leg length (upper leg length) BD1 of an RHM and leg posture (angle PD2 at the knee) when seated in the seat, the design equation "pilot seat depth=BD1×sin(PD1)" may be derived through expression of related human body variables.

Because the design dimensions for the width of the pilot seat are related to the buttock width BD3 of an RHM, the design equation "pilot seat width=BD3" may be derived through expression of related human body variables.

Next, representative human models (RHM) of the design target product are generated in operation S20.

The RHMs are a few selected individuals who adequately represent a statistical human body dimension diversity of the people for whom the product is to be designed, and each RHM has various human body variables (for example, distance, leg length, etc.) required for designing a product. For instance, in order to cover 90% of the target population for a design, a percentile may be applied to generate 3 individuals (5th, 50th, and 95th percentiles).

Next, design sensitivity is analyzed in operation S30.

Design sensitivity analysis is performed in two stages. First, postures according to changes in design dimensions are determined through computer simulation using the developed design equations and RHMs. For example, postures of RHMs can be calculated using the design equations while changing from the lowest to the highest design dimensions allowable.

Here, to exemplarily describe a posture ascertaining process for various pilot seat distances with respect to one RHM, the pilot seat distance conditions are varied by 1 cm increment within a designable range (for example, 30 cm-60 cm), and the postures in which the RHM can sit under the given pilot seat conditions are determined using the design equations and the human body dimensions of the RHM. More specifically, assuming that the upper leg length BD1 and the lower leg length BD2 of one RHM are 40 cm and 45 cm, respectively, and the distance of the pilot seat is 30 cm, with regard to the suitable postures in which the RHM can sit in the pilot seat, all the postures in which the RHM can sit in the pilot seat that is 30 cm high can be determined through a simulation process in which various posture conditions are input in the equation, "40×sin(PD1)−45×sin(PD2)" into which the human body dimensions of the RHM have been input in the design equation for the pilot seat height.

Figure 4:
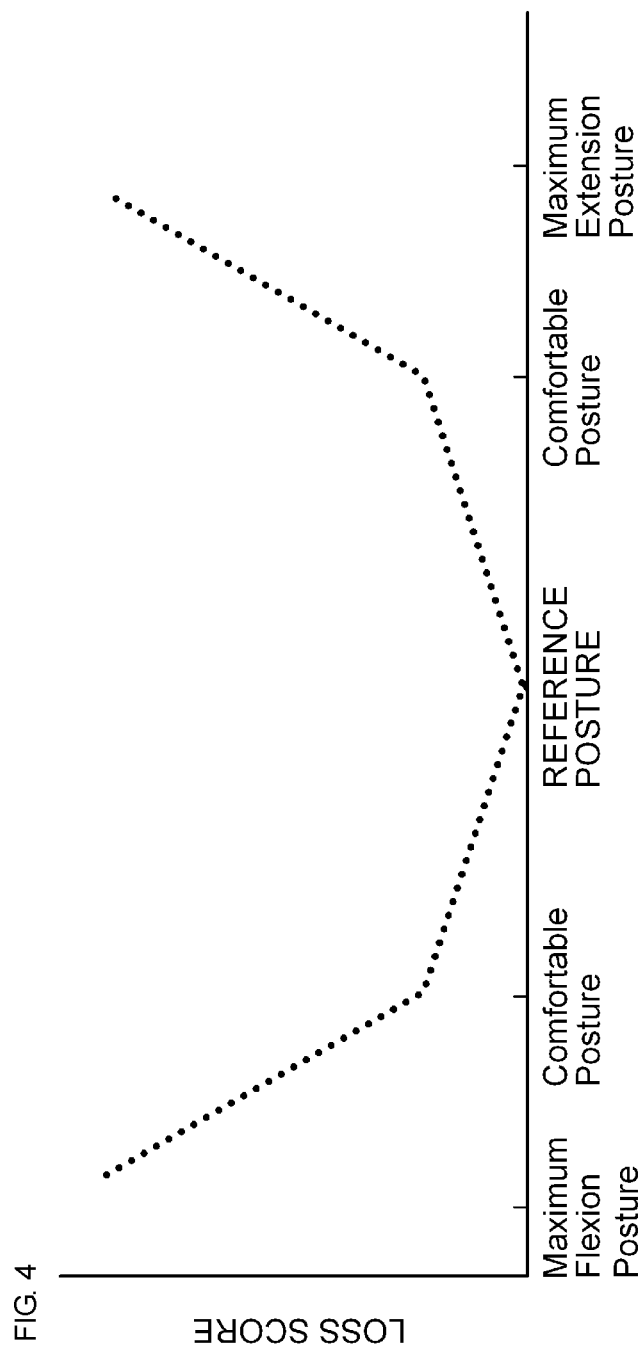
FIG. 4 is a graph showing a posture loss function.

The postures determined using the above method are transformed to a posture loss score by using a posture loss function such as that in FIG. 4 that increases linearly in posture loss with a deviation from a defined reference posture, after which a design sensitivity analysis (such as that in FIG. 5) is performed.

Because the posture conditions that can be adopted by one RHM for certain design dimensions can be varied (as described above), the posture loss function is used to select the posture most preferred out of the various postures. Because the posture loss score is a function that transforms postures of an RHM (for example, the bent angle of a leg) to a loss score, a loss score calculated through the posture loss function represents the amount of deviation from a defined reference posture. That is, when two or more possible postures are determined for specific design dimension conditions, the postures of an RHM for the design dimensions are substituted for existing postures in the posture loss function, and the posture condition that is calculated to have a lower posture loss score is selected. Also, the reference posture from the posture loss score may be set by the designer as the posture deemed most comfortable by humans, or may be set through experimentation and research of existing literature.

As exemplified in FIG. 4, the posture loss function is calculated by substituting posture data of an RHM in a loss function. The formulation of the posture loss function may be determined by a designer in accordance with design problems. For example, as exemplified in FIG. 4, within the range of comfortable positions (a comfortable posture threshold range), a slope of a posture loss function (for example, "loss score=0.5×|RHM posture−reference posture|") may be designated to be comparatively smaller, and a slope outside the range may be designated to sharply increase (for example, "loss score=1.0×|RHM posture−reference posture|").

An optimal design is determined in operation S40.

Figure 5:
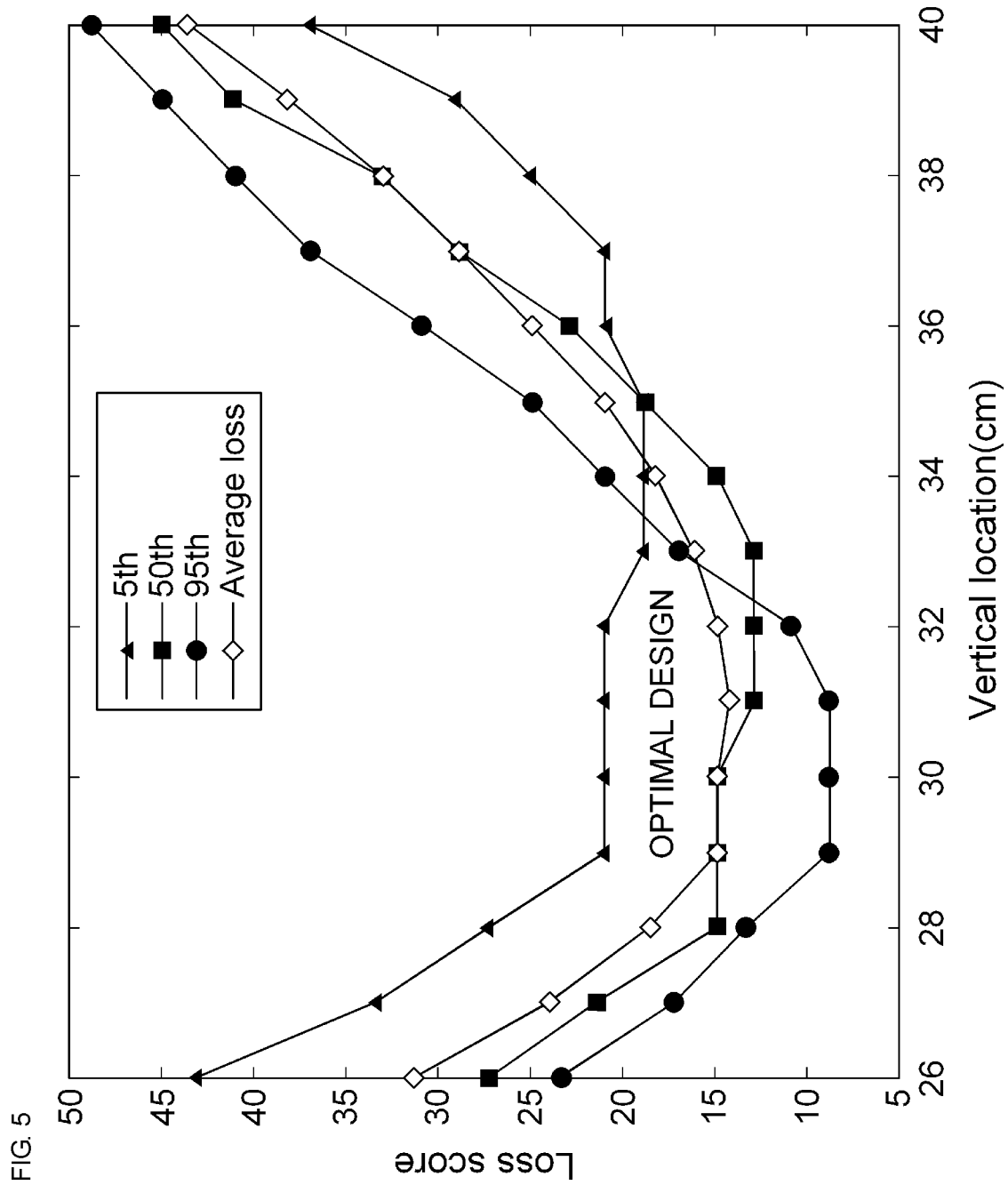
FIG. 5 is a graph showing design sensitivity analysis and determination of optimal design dimensions.

The optimal design dimensions are determined to minimize the posture loss score of a target population for a design based on design sensitivity analysis results. For instance, the design sensitivity for 3 RHMs (5th, 50th, and 95th percentiles) changes as shown in FIG. 5, according to changes in product design dimensions, and optimal design dimensions are determined to be 31 cm, which minimizes the posture loss score.

Embodiment of Design Equation

Design Variables and Design Dimensions of X and Y-Axis Coordinates for NSRP

FIGS. 6 through 21 are drawings of simulations for obtaining design equations for anthropometric design of a helicopter cockpit.

Figure 6:
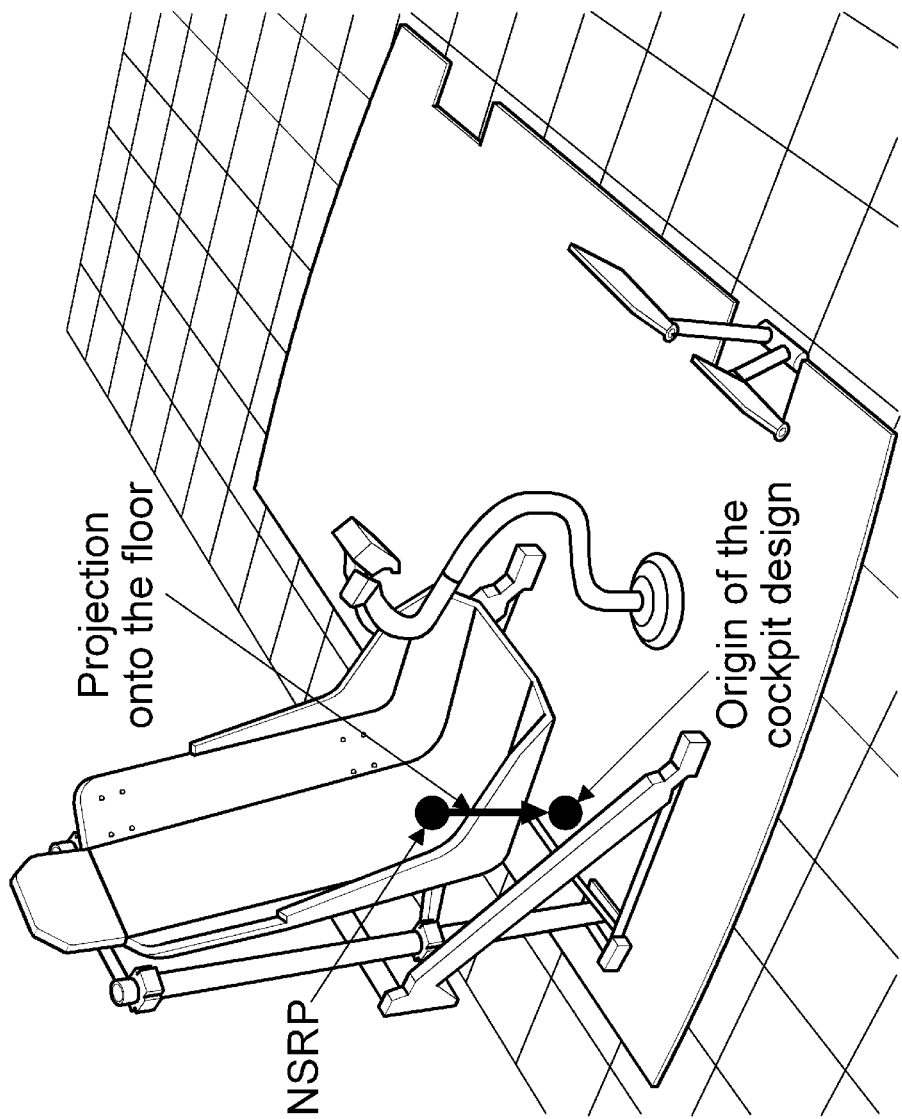
FIGS. 6 through 21 are drawings of simulations for obtaining design equations for anthropometric design of a helicopter cockpit, where

First, FIG. 6 is a drawing showing the origin of general coordinates, and Tables 1 and 2 show design variables and design dimensions of x and y-axis coordinates for the NSRP.

TABLE 1

| Design Variable | Seat-Neutral location-Lateral (x) (DD4) |
|---|---|
| Description | X-axis Coordinate of NSRP |
| Design Dimensions | 0 mm (origin of the cockpit design) |

TABLE 2

| Design Variable | Seat-Neutral location-Horizontal (y) (DD5) |
|---|---|
| Description | Y-axis Coordinate of NSRP |
| Design Dimensions | 0 mm (origin of the cockpit design) |

As shown in Tables 1 and 2, the x-axis coordinate design variable for the NSRP is the side (DD4) of the seat, and the design dimension is 0 mm. Also, the y-coordinate design variable for the NSRP is the left and right sides (DD5) of the seat, and the design dimension is 0 mm.

Vertical Height (DD6) from SRP to Floor of Pilot Seat

Figure 7:
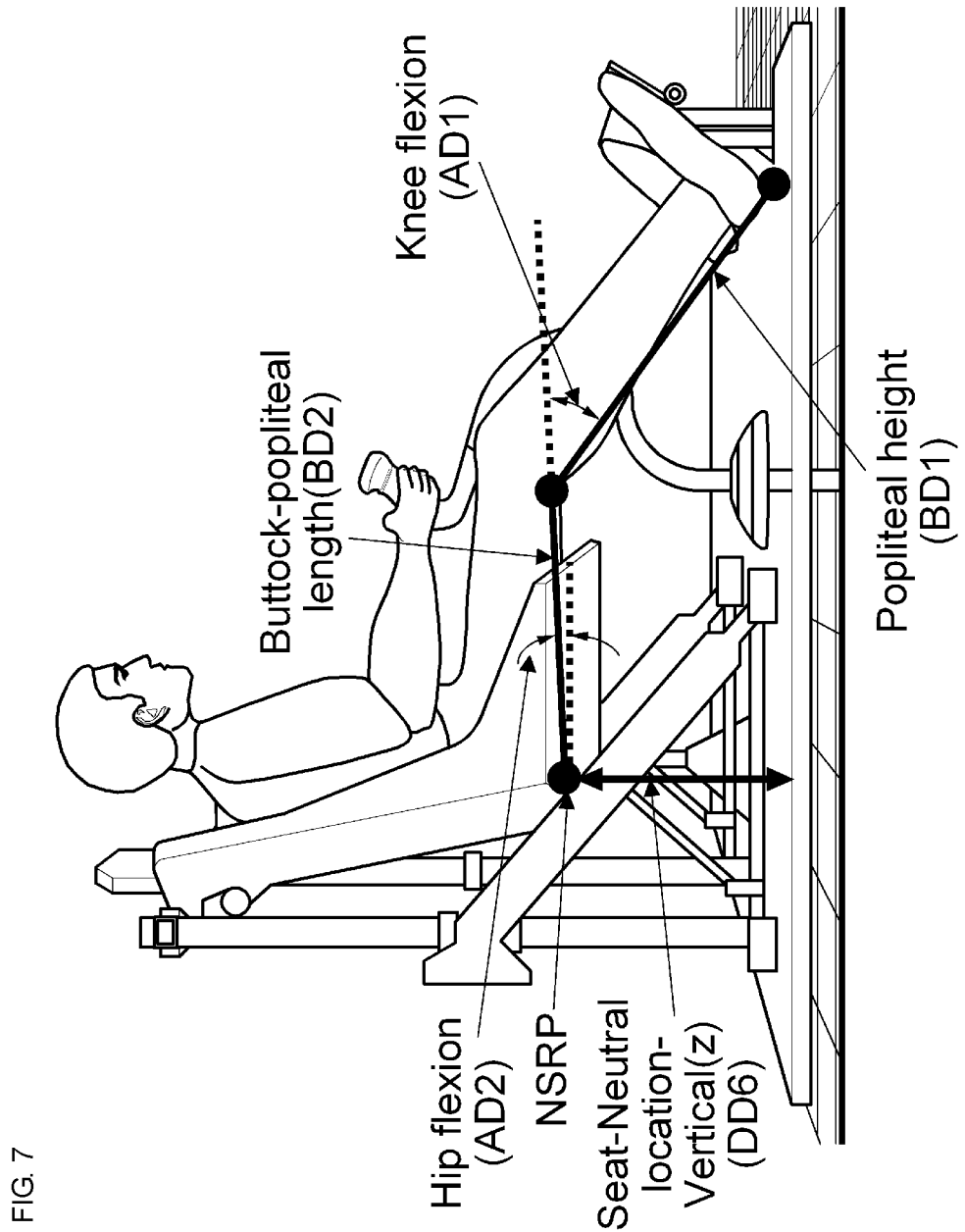

FIG. 7 is an exemplary drawing for obtaining a design equation for the horizontal height from the seat reference point (SRP) to the floor.

The vertical height DD6 from the SRP to the floor, as shown in Table 3 below, is related to factors including human body variables (human body dimensions and angles), related design variables, and heel height. Here, the human body variables include a distance BD1 from the floor to the popliteus, the distance BD2 from the buttock to the popliteus, knee flexion AD1, and the seat-pan angle, and the related design variables include the seat-pan angle (MIL-STD-1333B: 10°-20°). Here, the heel height is assumed to be 25 mm.

TABLE 3

| Design Variable | Seat-Neutral location-Vertical (z) (DD6) |
|---|---|
| Description | Horizontal Height from SRP to Floor |
| Design Principle | Design for Average Person |
| Related Design Variables | Seat-pan Angle (MIL-STD-1333B: 10°-20°) |
| Human Body Variables — Human Body Dimensions | Popliteal Distance (BD1) |
| | Buttock-Popliteus length (BD2) |
| Human Body Angles | Knee Flexion (AD1) |
| | Seat-pan Angle |
| Design Equation | DD6 = BD1 × sin(AD1-AD2) − BD2 × sin(Seat-pan Angle) + 25 |
| Design Dimension | 267 mm |

The design equation for the vertical height DD6 from the SRP to the floor is Equation 1.

$$DD6 = BD1 \times \sin(AD1) - BD2 \times \sin(\text{Seat-pan Angle}) + 25 \quad \text{Equation 1}$$

Here, 25 is the heel distance expressed in millimeter.

In embodiments of the present invention, the above design equation is used with the vertical height DD6 from the SRP to the floor implemented as 267 mm.

Y-Axis Horizontal Distance from DEP to NSRP

Figure 8:
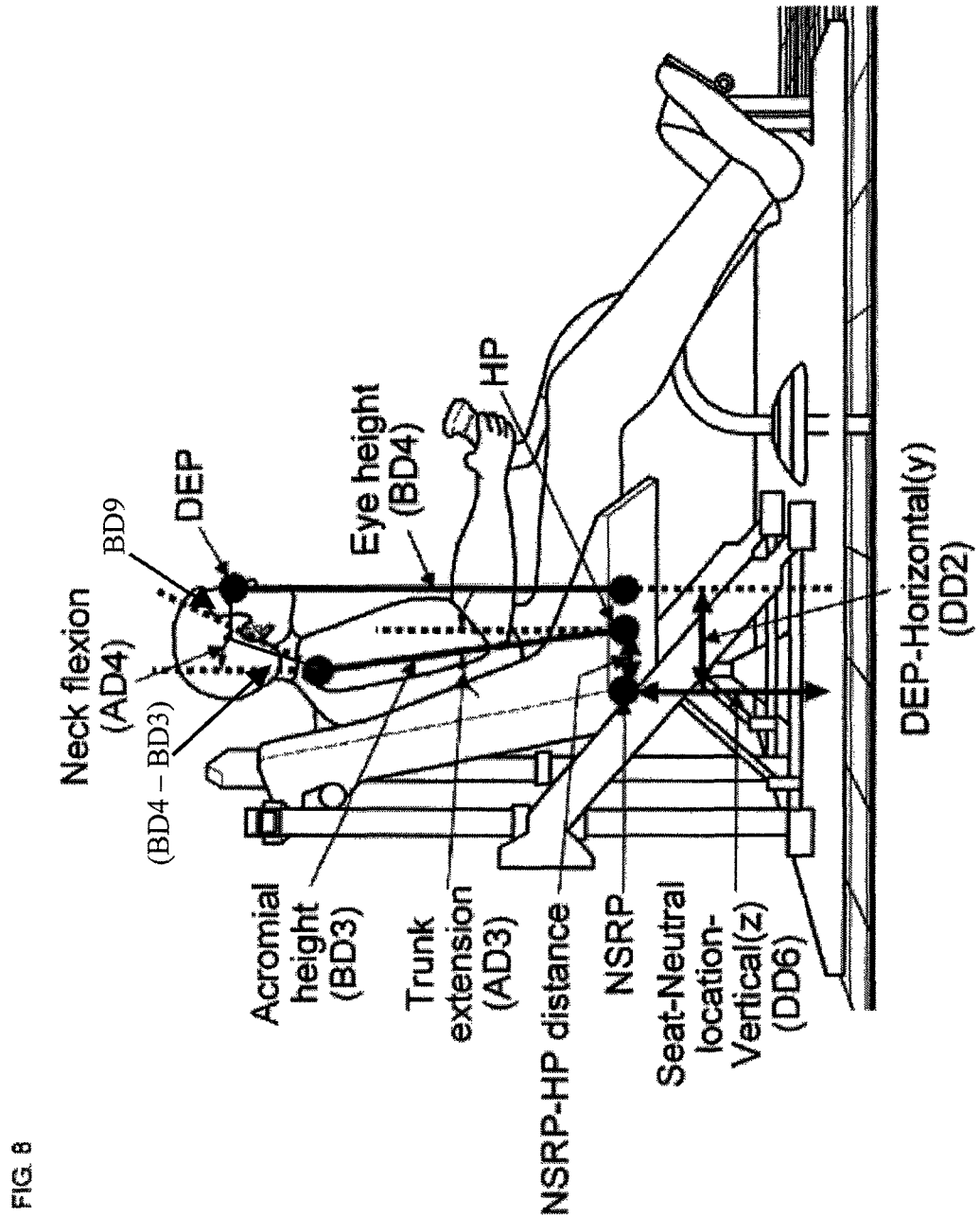

FIG. 8 is an exemplary drawing for obtaining a design equation for the horizontal distance of the y-axis from the design eye point (DEP) to the NSRP.

The y-axis horizontal distance DD2 from the DEP to the NSRP is related to human body variables such as the acromial distance BD3 from the SRP to the shoulder, eye distance BD4 from the SRP to the eye, eye-to-body-centerline distance BD9, seat-back angle AD3, and a neck flexion angle AD4, and related design variables such as left and right sides DD4 of the seat, horizontal distance between the NSRP and HP, seat-pan angle, and seat-back angle. Here, the horizontal distance between the NSRP and HP may be 110 mm, the seat-pan angle may be 10°-20°, and the seat-back angle may be 13° (MIL SPEC). Given that the horizontal measurement reference points of the HP horizontal position and the acromial height are similar, the design equation for the y-axis horizontal distance DD2 from the DEP to the NSRP is Equation 2 below.

$$DD2 = 110 - BD3 \times \sin(AD3) + (BD4 - BD3) \times \sin(AD4) + BD9 \quad \text{Equation 2}$$

The design variables, related design variables, human body variables, and design dimensions in the design equation for the y-axis horizontal distance DD2 from the DEP to the NSRP are shown in Table 4 below.

TABLE 4

| Design Variable | | DEP-Horizontal (y) (DD2) |
|---|---|---|
| Description | | Y-axis Horizontal Distance from DEP to NSRP |
| Design Principle | | Design for Average Person |
| Related Design Variables | | Seat-Neutral location-Horizontal (y) (DD4) |
| | | NSRP-HP Horizontal Distance: 110 mm |
| | | Seat-pan Angle: 10°-20° |
| | | Seatback Angle: 13° (MIL SPEC) |
| Human Body Variables | Human Body Dimensions | Acromial Height (BD3) |
| | | Eye Height (BD4) |
| | | Eye-to-Body-Centerline Distance (BD9) |
| | Human Body Angles | Trunk Extension (AD3) ∝ Seatback Angle |
| | | Neck Flexion Angle (AD4) |
| Design Equation | | DD2 = 110 − BD3 × sin(AD3) + (BD4 − BD3) × sin(AD4) + BD9 |
| Design Dimension | | 157 mm |

In embodiments of the present invention, the above design equation is used with the y-axis horizontal distance DD2 from the DEP to the NSRP implemented as 157 mm.

Vertical Distance from DEP to Floor

Figure 9:
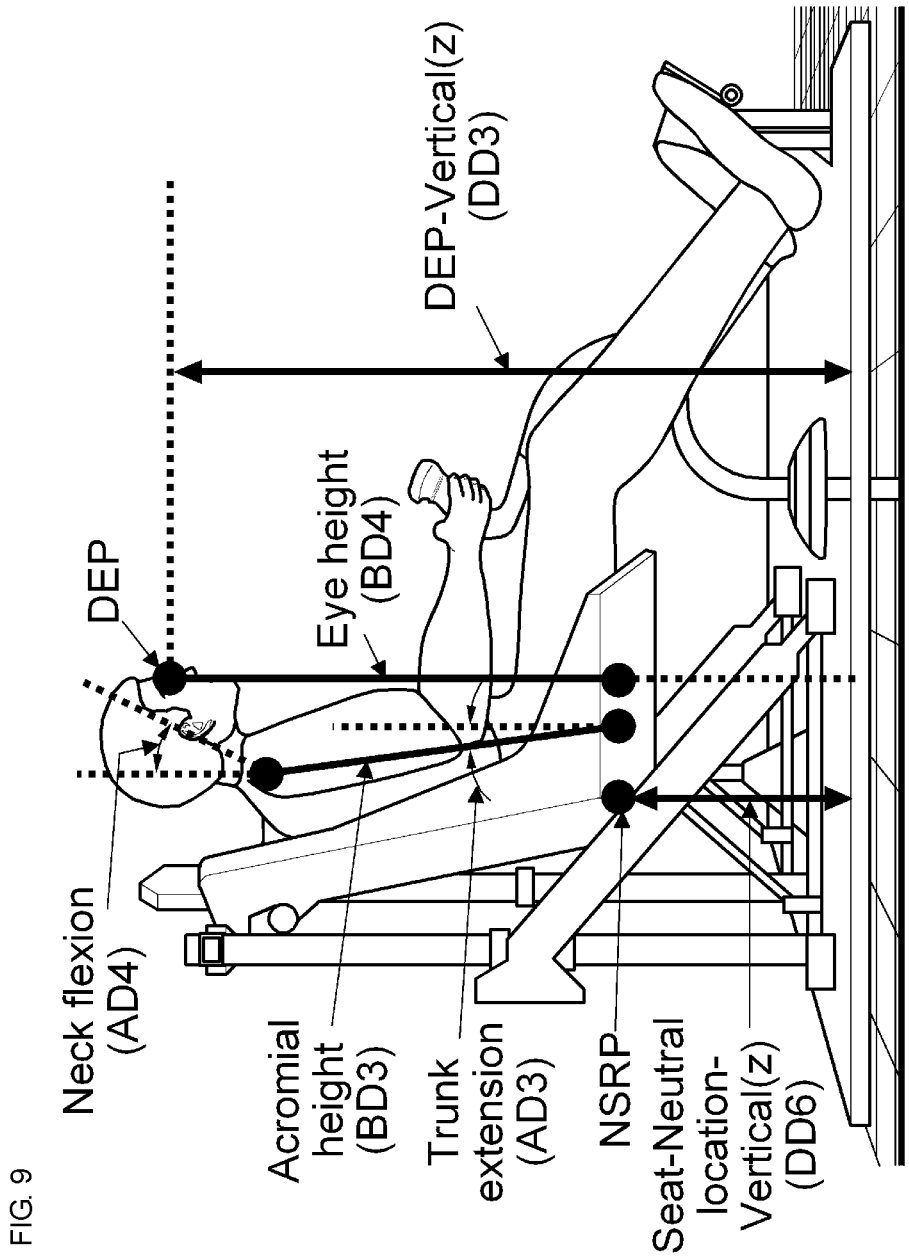

FIG. 9 is an exemplary drawing for obtaining a design equation for the vertical distance from the DEP to the floor.

The vertical distance DD3 from the DEP to the floor is related to human body variables such as acromial height BD3 from the SRP to the shoulder, eye distance BD4 from the SRP to the eye, seatback angle AD3, and a neck flexion angle AD4, and to the related design variables such as vertical distance DD6 from the SRP to the floor, and seatback angle (MIL-STD-1333B: 13°), and these can be expressed in Equation 3 below.

$$DD3 = DD6 + BD3 \times \cos(AD3) + (BD4 - BD3) \times \cos(AD4) \quad \text{Equation 3}$$

The design variables, related design variables, human body variables, and design dimensions in the design equation for the vertical distance DD3 from the DEP to the floor are shown in Table 5 below.

TABLE 5

| Design Variable | | DEP-Vertical (z) (DD3) |
|---|---|---|
| Description | | Vertical Distance from DEP to Floor |
| Design Principle | | Design for Average Person |
| Related Design Variables | | Seat-Neutral location-Vertical (z) (DD6) |
| | | Seatback Angle (MIL-STD-1333B: 13°) |
| Human body Variables | Human Body Dimensions | Acromial Height (BD3) |
| | | Eye Height (BD4) |
| | Human Body Angles | Trunk Extension (AD3) ∝ Seatback Angle |
| | | Neck Flexion Angle (AD4) |
| Design Equation | | DD3 = DD6 + BD3 × cos(AD3) + (BD4 − BD3) × cos(AD4) |
| Design Dimension | | 1054 mm |

In embodiments of the present invention, the above design equation is used with the vertical distance DD3 from the DEP to the floor implemented as 1054 mm.

Pilot Seat Horizontal Adjustment Range DD7

Figure 10:
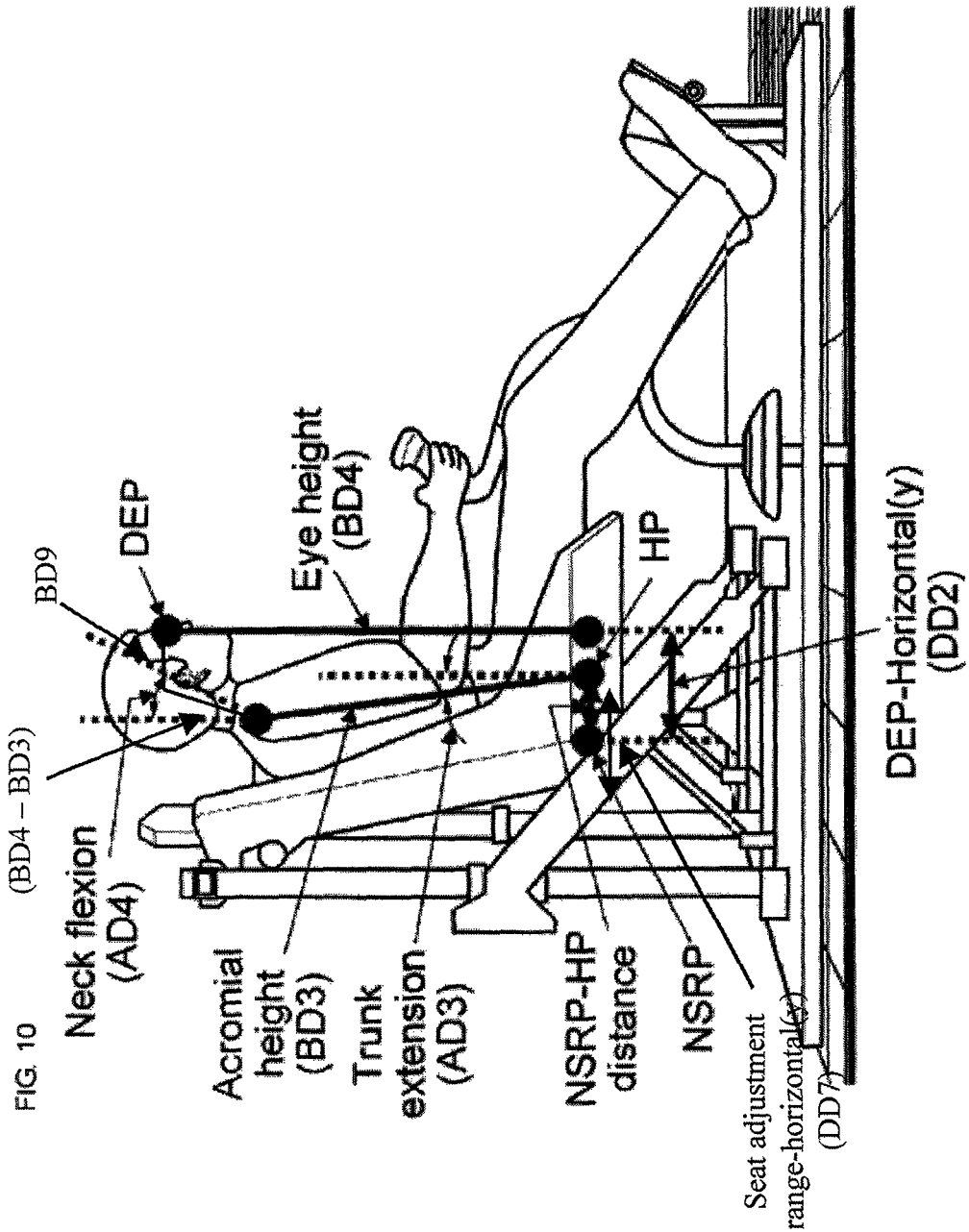

FIG. 10 is an exemplary drawing for showing a design equation for the horizontal adjustment range of the pilot seat.

The horizontal adjustment range DD7 of the pilot seat is related to human body variables such as acromial height BD3 from the SRP to the shoulder, eye height BD4 from the SRP to the eye, eye-to-body-centerline distance BD9, seatback angle AD3, and neck flexion angle AD4, and related design variables such as y-axis horizontal distance DD2 from the DEP to the NSRP, horizontal distance between the NSRP and HP, and the seatback angle. Here, the horizontal distance between the NSRP and the HP may be 110 mm, and the seatback angle may be 13° (MIL SPEC).

Equation 4 below is the design equation for the horizontal adjustment range DD7 of the pilot seat.

$$DD7 = 110 - \{DD2 - (BD4 - BD3) \times \sin(AD4) + BD3 \times \sin(AD3)\} + BD9 \quad \text{Equation 4}$$

Here, the number '110' represents the horizontal distance (mm) between the NSRP and HP, which is assumed to be 110 mm in the present embodiment.

The design variables, related design variables, human body variables, and design dimensions of the design equation for the horizontal adjustment range of the pilot seat DD7 are shown in Table 6 below.

TABLE 6

| Design Variable | | Seat-Adjustment range-Horizontal (y) (DD7) |
|---|---|---|
| Description | | Pilot Seat Horizontal Adjustment Range |
| Design Principle | | Design for Adjustability |
| Related Design Variables | | DEP-Horizontal (y) (DD2) |
| | | NSRP-HP Horizontal Distance: 110 mm |
| | | Seatback Angle: 13° (MIL SPEC) |
| Human Body Variables | Human Body Dimensions | Acromial Height (BD3) |
| | | Eye Height (BD4) |
| | | Eye-to-Body-Centerline Distance (BD9) |
| | Human Body Angles | Trunk Extension (AD3) ∝ Seatback Angle |
| | | Neck Flexion Angle (AD4) |
| Design Equation | | DD7 = 110 − {DD2 − (BD4 − BD3) × sin(AD4) + BD3 × sin(AD3)} + BD9 |
| Design Dimension | | 60 mm |

In embodiments of the present invention, the above design equation is used with the pilot seat horizontal adjustment range DD3 implemented as 60 mm.

Pilot Seat Vertical Adjustment Range (DD8)

Figure 11:
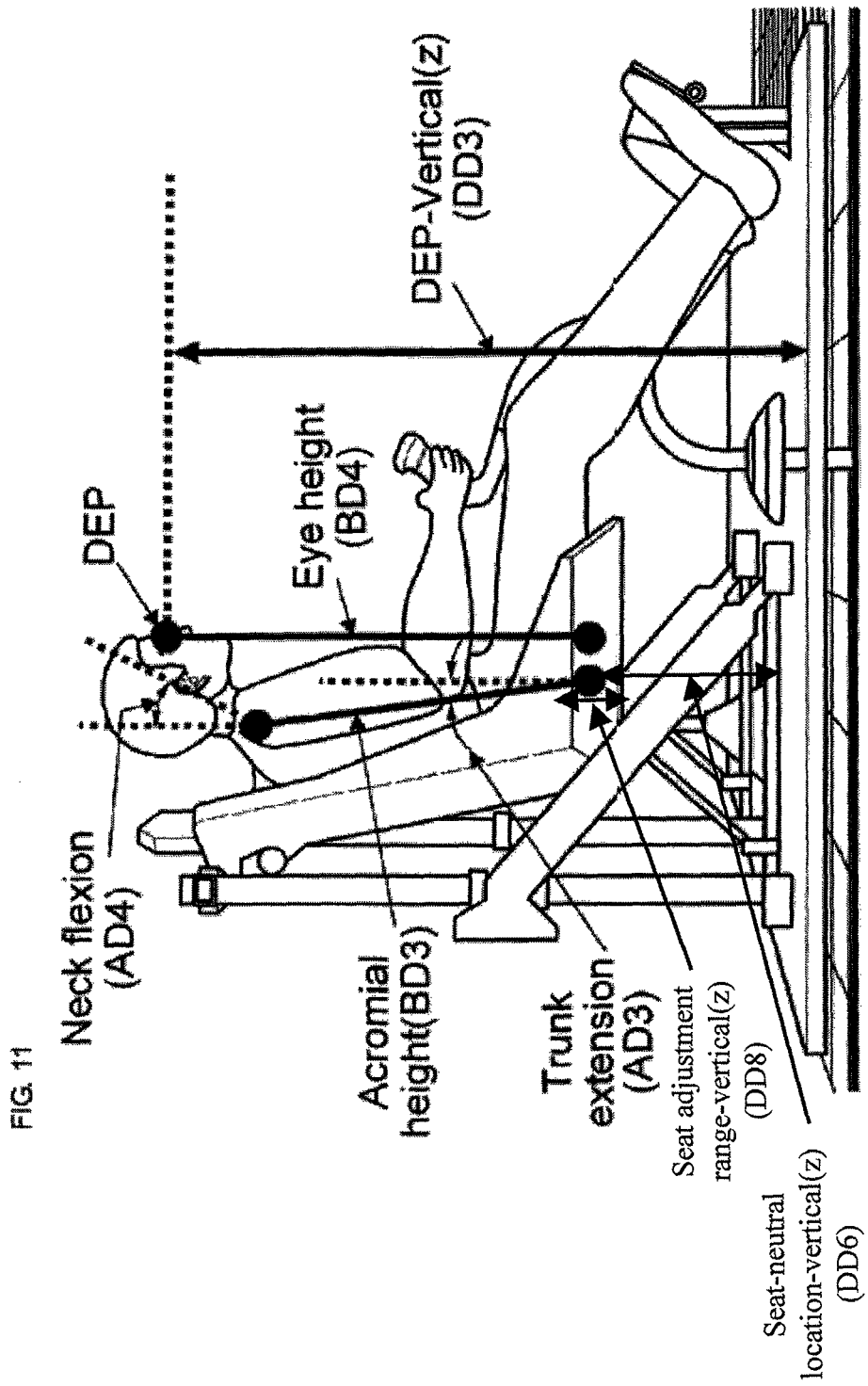

FIG. 11 is an exemplary drawing for obtaining a design equation for the vertical adjustment range of the pilot seat.

The vertical adjustment range DD8 of the pilot seat is related to human body variables such as acromial height BD3 from the SRP to the shoulder, eye height BD4 from the SRP to the eye, seatback angle AD3, and neck flexion angle AD4, and related design variables such as vertical distance DD3 from the DEP to the floor and the seatback angle (13°), and Equation 5 below is a design equation for the above.

$$DD8 = DD3 - (BD4 - BD3) \times \cos(AD4) - BD3 \times \cos(AD3) - DD6 \quad \text{Equation 5}$$

The design variables, related design variables, human body variables, and design dimensions in the design equation for the pilot seat vertical adjustment range DD8 are shown in Table 7 below.

TABLE 7

| Design Variable | | Seat-Adjustment range-Vertical (z) (DD8) |
|---|---|---|
| Description | | Pilot Seat Vertical Adjustment Range |
| Design Principle | | Design for Adjustability |
| Related Design Variables | | DEP-Vertical (z) (DD3) |
| | | Seatback Angle: 13° (MIL SPEC) |
| Human Body Variables | Human Body Dimensions | Acromial Height (BD3) |
| | | Eye Height (BD4) |
| | Human Body Angles | Trunk Extension (AD3) ∝ Seatback Angle |
| | | Neck Flexion Angle (AD4) |
| Design Equation | | DD8 = DD3 − (BD4 − BD3) × cos(AD4) − BD3 × cos(AD3) − DD6 |
| Design Dimension | | 96 mm |

In embodiments of the present invention, the above design equation is used with the pilot seat vertical adjustment range DD8 implemented at 96 mm.

Table 8 below shows design variables and design dimensions for an x-axis horizontal distance from the cyclic control to the NSRP.

TABLE 8

| | |
|---|---|
| Design Variable | Cyclic Control-Neutral Location-Lateral (x) (DD9) |
| Description | X-axis Horizontal Distance from Cyclic Control to NSRP |
| Design Dimension | 0 mm (origin of the cockpit design) |

As shown in Table 8, the design dimension for the x-axis horizontal distance from the cyclic control to the NSRP is 0 mm.

Y-Axis Horizontal Distance from Cyclic Control to NSRP

Figure 12:
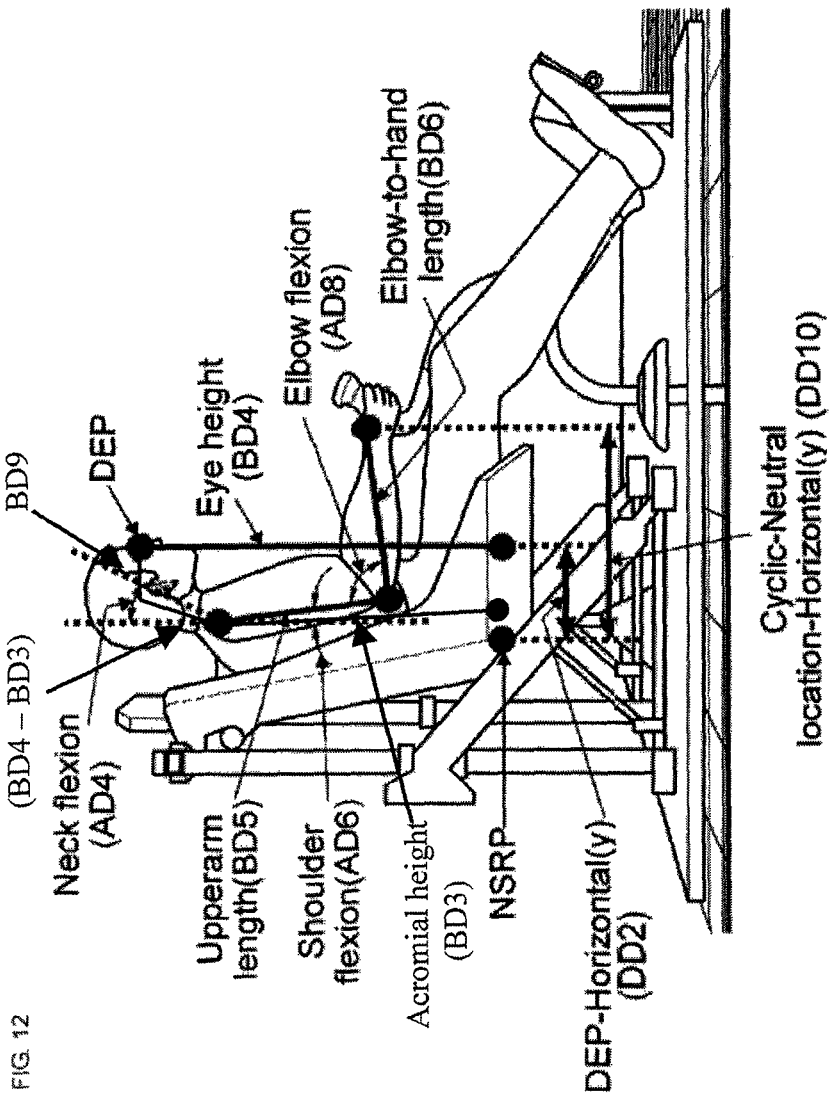

FIG. 12 is an exemplary drawing for obtaining a design equation for the horizontal distance of the y-axis from the cyclic control to the NSRP.

The y-axis horizontal distance DD10 from the cyclic control to the NSRP is related to human body variables such as acromial height BD3 from the SRP to the shoulder, eye height BD4 from the SRP to the eye, upper arm length BD5, elbow-to-hand length BD6, eye-to-body-centerline distance BD9, a neck flexion angle AD4, shoulder flexion AD6, elbow flexion AD8, and shoulder rotation AD9, and related design variables such as the y-axis horizontal distance DD2 from the DEP to the NSRP, and the pilot seat horizontal adjustment range DD7. Here, the pilot seat horizontal adjustment range DD7 may be 60 mm.

The design equation for the y-axis horizontal distance DD10 from the cyclic control to the NSRP is Equation 6 below, where the flexion and rotation of shoulder (from the 3 ranges of movement at the shoulder joint) affect the horizontal distance of the cyclic control, presuming that there will be no collision with the cyclic control when the pilot seat is moved within the maximum horizontal range.

$$DD10 = DD2 - BD9 - (BD4 - BD3) \times \sin(AD4) + BD5 \times \sin(AD6) + BD6 \times \cos(AD9) \times \cos(AD8 + AD6) \times \cos(AD9) \quad \text{Equation 6}$$

The design variables, related design variables, human body variables, and design dimensions in the design equation for the y-axis horizontal distance DD10 from the cyclic control to the NSRP are shown in Table 9.

TABLE 9

| | | |
|---|---|---|
| Design Variable | | Cyclic Control-Neutral Location-Horizontal (y) (DD10) |
| Description | | Y-axis Distance from Cyclic Control to NSRP |
| Design Principle | | Design for Average Person |
| Related Design Variables | | DEP-Horizontal (y) (DD2) |
| | | Seat-Adjustment Range-Horizontal (y) (DD7): 60 mm |
| Human body Variables | Human Body Dimensions | Acromial Height (BD3) |
| | | Eye Height (BD4) |
| | | Upper Arm Length (BD5) |
| | | Elbow-to-Hand Length (BD6) |
| | | Eye-to-Body-center line (BD9) |
| | Human Body Angles | Neck Flexion Angle (AD4) |
| | | Shoulder Flexion (AD6) |
| | | Elbow Flexion (AD8) |
| | | Shoulder Rotation (AD9) |
| Design Equation | | DD10 = DD2 − BD9 − (BD4 − BD3) × sin(AD4) + BD5 × sin(AD6) + BD6 × cos(AD9) × cos(AD8 + AD6) × cos(AD9) |
| Design Dimension | | 432 mm |

In embodiments of the present invention, the above design equation is used with the y-axis horizontal distance (DD10) from the cyclic control to the NSRP implemented as 432 mm.

Vertical Distance from Cyclic Control to Floor

Figure 13:
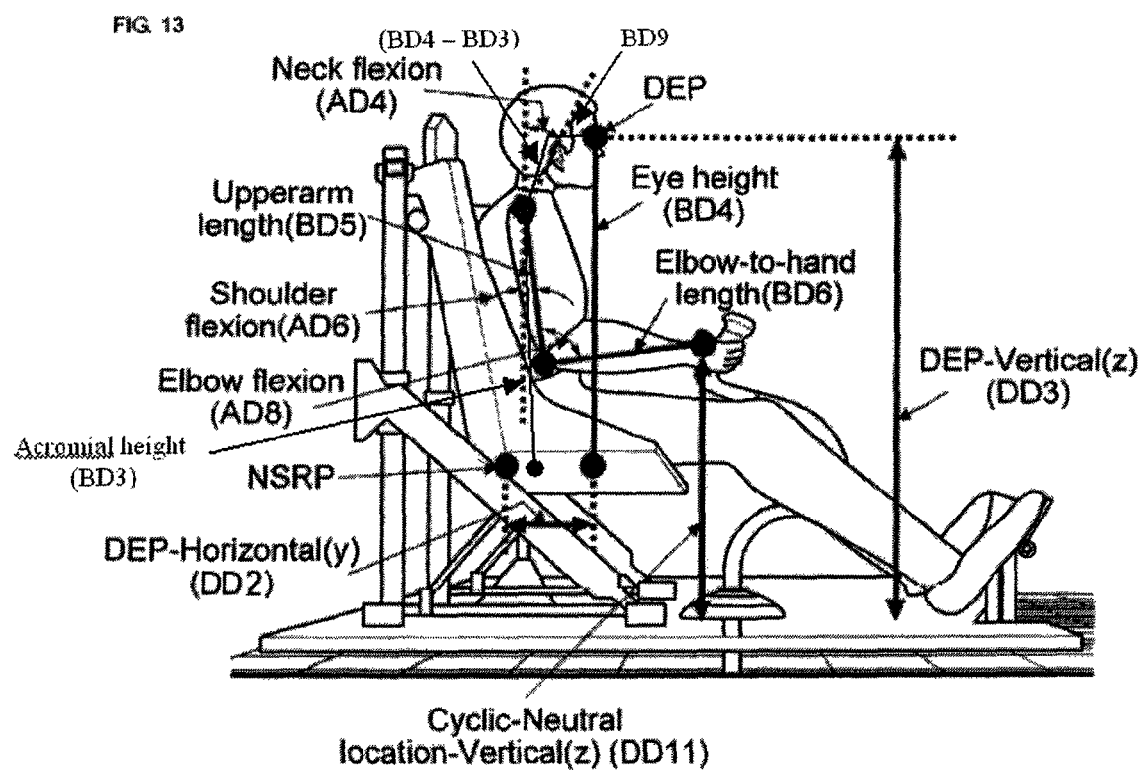
Figure 14:
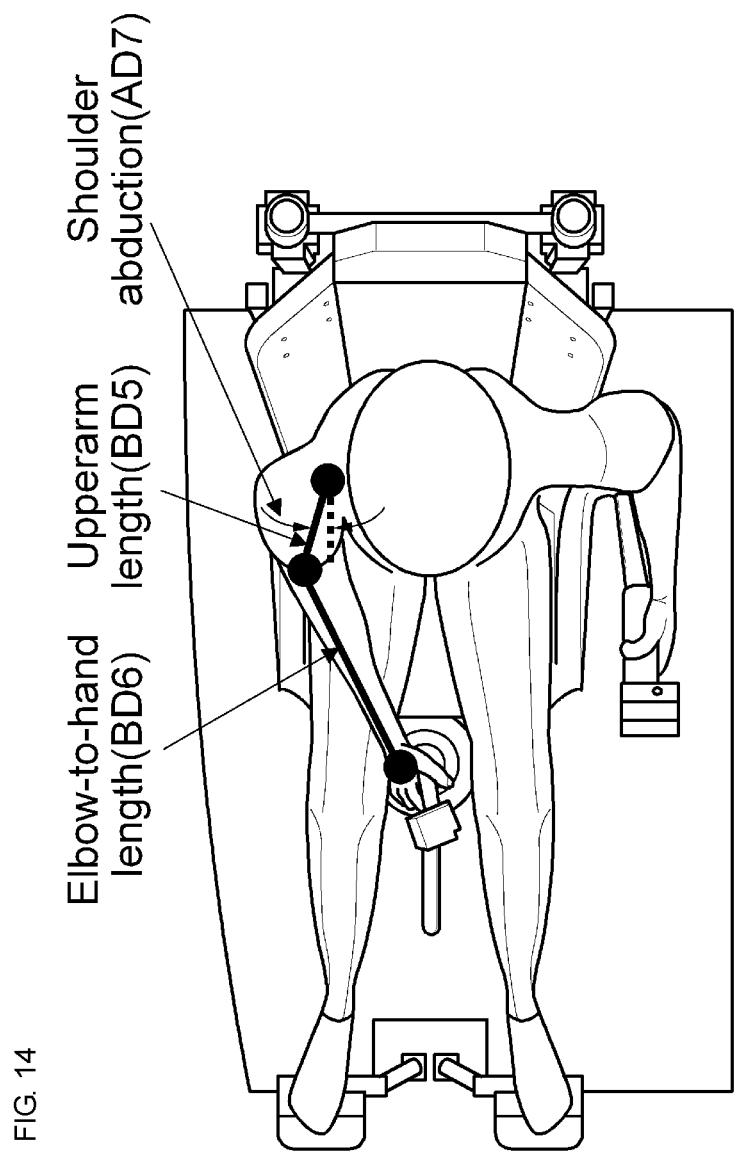

FIGS. 13 and 14 are exemplary drawings for obtaining a design equation for the vertical distance from the cyclic control to the floor.

The vertical distance (DD11) from the cyclic control to the floor is related to human body variables such as acromial height BD3 from the SRP to the shoulder, eye height BD4 from the SRP to the eye, upper arm length BD5, elbow-to-hand length BD6, a neck flexion angle AD4, shoulder flexion AD6, shoulder abduction AD7, and elbow flexion AD8, and related design variables such as vertical distance DD3 from the DEP to the floor, and the pilot seat vertical adjustment range DD8. Here, the pilot seat vertical adjustment range may be 142 mm.

The design equation for the vertical distance DD11 from the cyclic control to the floor is Equation 7 below, where the flexion and rotation of shoulder (from the 3 ranges of movement at the shoulder joint) affect the vertical distance of the cyclic control, presuming that there will be no collision with the cyclic control when the pilot seat is moved within the maximum vertical range.

$$DD11 = DD3 - (BD4 - BD3) \times \cos(AD4) - BD5 \times \cos(AD6) \times \cos(AD7) - BD6 \times \cos(AD8 + AD6) \quad \text{Equation 7}$$

The design variables, related design variables, human body variables, and design dimensions in the design equation for the vertical distance DD11 from the cyclic control to the floor are shown in Table 10 below.

TABLE 10

| | | |
|---|---|---|
| Design Variable | | Cyclic Control-Neutral Location-Vertical (z) (DD11) |
| Description | | Vertical Distance from Cyclic Control to Floor |
| Design Principle | | Design for Average Person |
| Related Design Variables | | DEP-Vertical (z) (DD3) |
| | | Seat-Adjustment Range-Vertical (z) (DD8): 142 mm |
| Human body Variables | Human Body Dimensions | Acromial Height (BD3) |
| | | Eye Height (BD4) |
| | | Upper Arm Length (BD5) |
| | | Elbow-to-hand Length (BD6) |
| | Human Body Angles | Neck Flexion Angle (AD4) |
| | | Shoulder Flexion (AD6) |
| | | Shoulder Abduction (AD7) |
| | | Elbow Flexion (AD8) |
| Design Equation | | DD11 = DD3 − (BD4 − BD3) × cos(AD4) − BD5 × cos(AD6) × cos(AD7) − BD6 × cos(AD8 + AD6) |
| Design Dimension | | 559 mm |

In embodiments of the present invention, the above design equation is used, where the vertical distance DD11 from the cyclic control to the floor is implemented as 559 mm.

X-Axis Horizontal Distance from Collective Control to DEP

Figure 15:
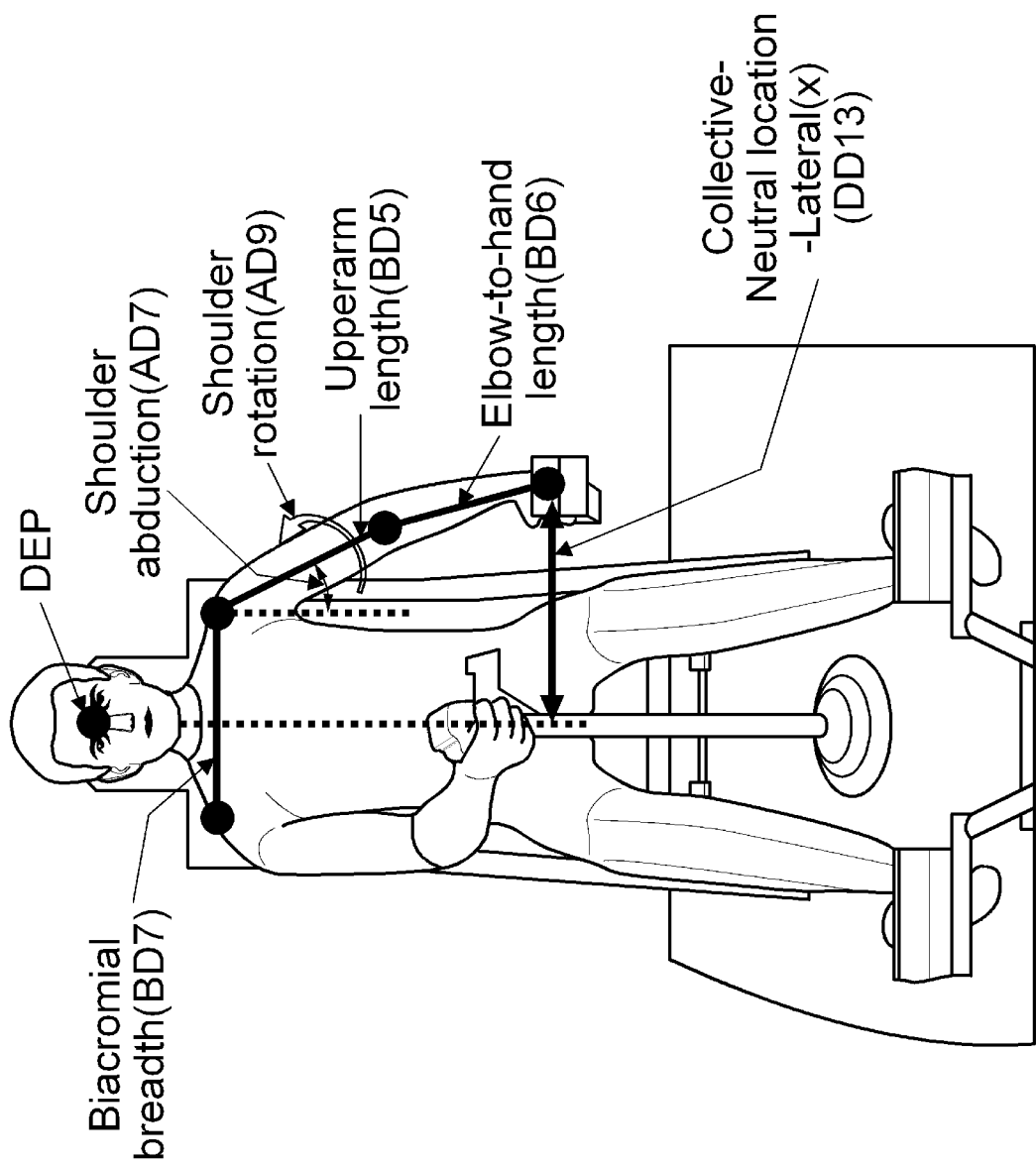

FIG. 15 is an exemplary drawing for obtaining a design equation for the horizontal distance of an x-axis from the collective control to the DEP.

The x-axis horizontal distance DD13 from the collective control to the DEP is related to human body variables such as upper arm length BD5, elbow-to-hand length BD6, biacromial breadth BD7, shoulder abduction AD7, and shoulder rotation AD9, and related design variables such as the x-axis horizontal distance DD4 from the DEP to the sides, and Equation 8 below is the design equation thereof.

$$DD13 = BD7/2 + BD5 \times \sin(AD7) - BD6 \times \sin(AD9) \quad \text{Equation 8}$$

The design variables, the related design variables, human body variables, and design dimensions of the design equation for the x-axis horizontal distance DD13 from the collective control to the DEP are shown in Table 11 below.

TABLE 11

| Design Variable | | Collective Control-Neutral Location-Lateral (x) (DD13) |
|---|---|---|
| Description | | X-axis Horizontal Distance from Cyclic Control to DEP |
| Design Principle | | Design for Average Person |
| Related Design Variables | | DEP-Lateral (x) (DD4) |
| Human body Variables | Human Body Dimensions | Upper Arm Length (BD5) Elbow-to-hand Length (BD6) Biacromial Breadth (BD9) |
| | Human Body Angles | Shoulder Abduction (AD7) Shoulder Rotation (AD9) |
| Design Equation | | DD13 = BD7/2 + BD5 × sin(AD7) − BD6 × sin(AD9) |
| Design Dimension | | 315 mm |

In embodiments of the present invention, the above design equation is used, where the x-axis horizontal distance DD13 from the collective control to the DEP is implemented as 315 mm.

Y-Axis Horizontal Distance from Collective Control to DEP

Figure 16:
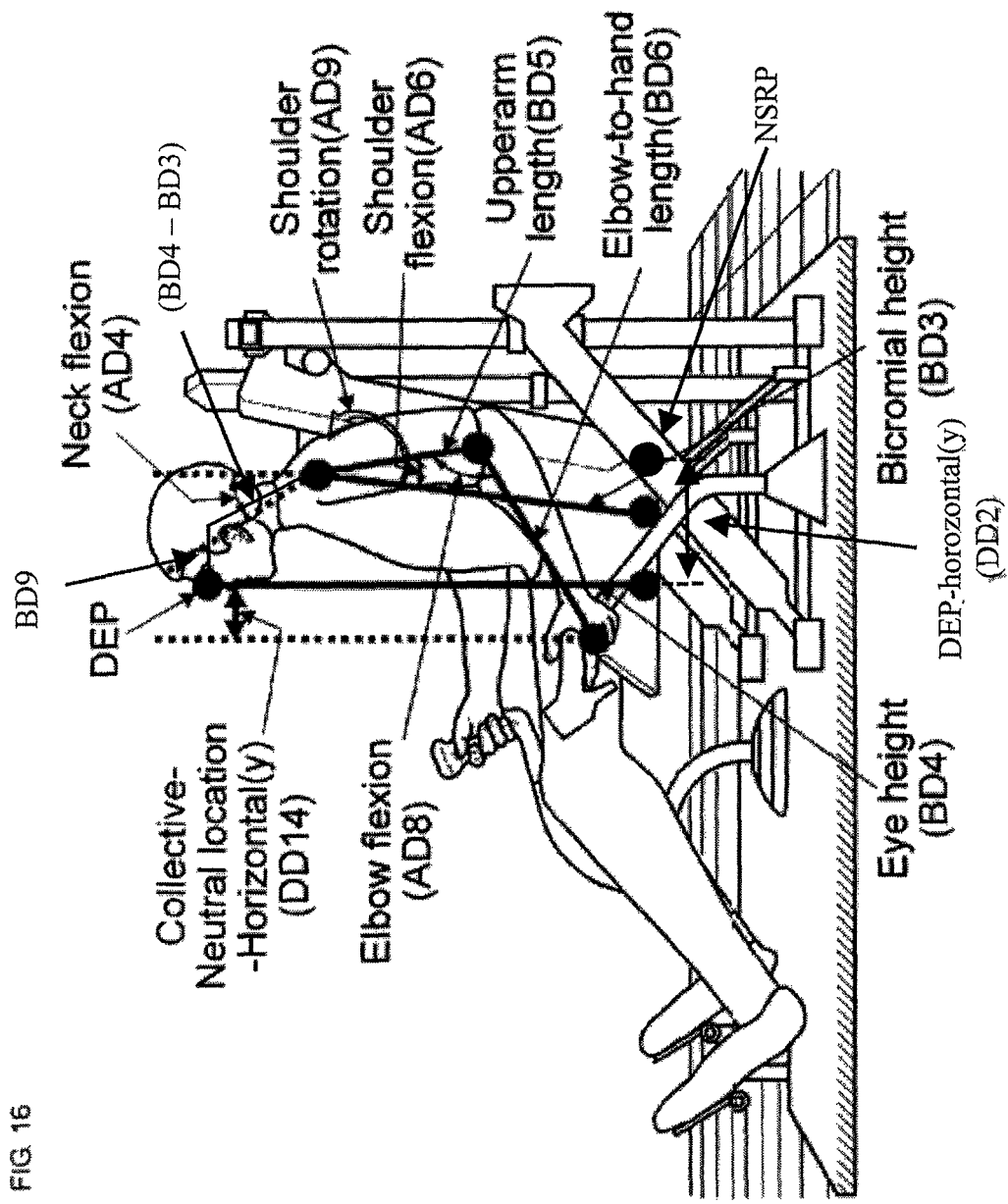

FIG. 16 is an exemplary drawing for obtaining a design equation for the horizontal distance of the y-axis from the collective control to the DEP.

The y-axis horizontal distance DD14 from the collective control to the DEP is related to human body variables such as acromial height BD3 from the SRP to the shoulder, eye height BD4 from the SRP to the eye, upper arm length BD5, elbow-to-hand length BD6, and shoulder rotation AD9, and related design variables such as the y-axis horizontal distance DD2 from the DEP to the sides.

The design equation for the y-axis horizontal distance DD14 from the collective control to the DEP is Equation 9 below, where it is assumed that the collective control can be controlled when the pilot seat is moved within its horizontal maximum/minimum range.

$$DD14 = BD9 - (BD4 - BD3) \times \sin(AD4) + BD5 \times \sin(AD6) + BD6 \times \cos(AD8 + AD6) \times \cos(AD9) \quad \text{Equation 9}$$

The design variables, related design variables, human body variables, and design dimensions in the design equation for the y-axis horizontal distance DD14 from the collective control to the DEP are shown in Table 12 below.

TABLE 12

| Design Variable | | Cyclic Control-Neutral Location-Horizontal (y) (DD14) |
|---|---|---|
| Description | | Y-axis Horizontal Distance from Cyclic Control to DEP |
| Design Principle | | Design for Average Person |
| Related Design Variables | | DEP-Horizontal (y) (DD2) Seat-adjustment Range-Horizontal (z) (DD7) |
| Human Body Variables | Human Body Dimensions | Acromial Height (BD3) Eye Height (BD4) Upper Arm Length (BD5) Elbow-to-Hand Length (BD6) Eye-to-Body-Centerline Distance (BD9) |
| | Human Body Angles | Neck Flexion Angle (AD4) Shoulder Flexion (AD6) Elbow Flexion (AD8) Shoulder Rotation (AD9) |
| Design Equation | | DD14 = DD2 − BD9 − (BD4 − BD3) × sin(AD4) + BD5 × sin(AD6) + BD6 × cos(AD8 + AD6) × cos(AD9) |
| Design Dimension | | 102 mm |

In embodiments of the present invention, the above design equation is used, where the y-axis horizontal distance DD14 from the cyclic control to the DEP is implemented as 102 mm.

Vertical Distance from Collective Control to DEP

Figure 17:
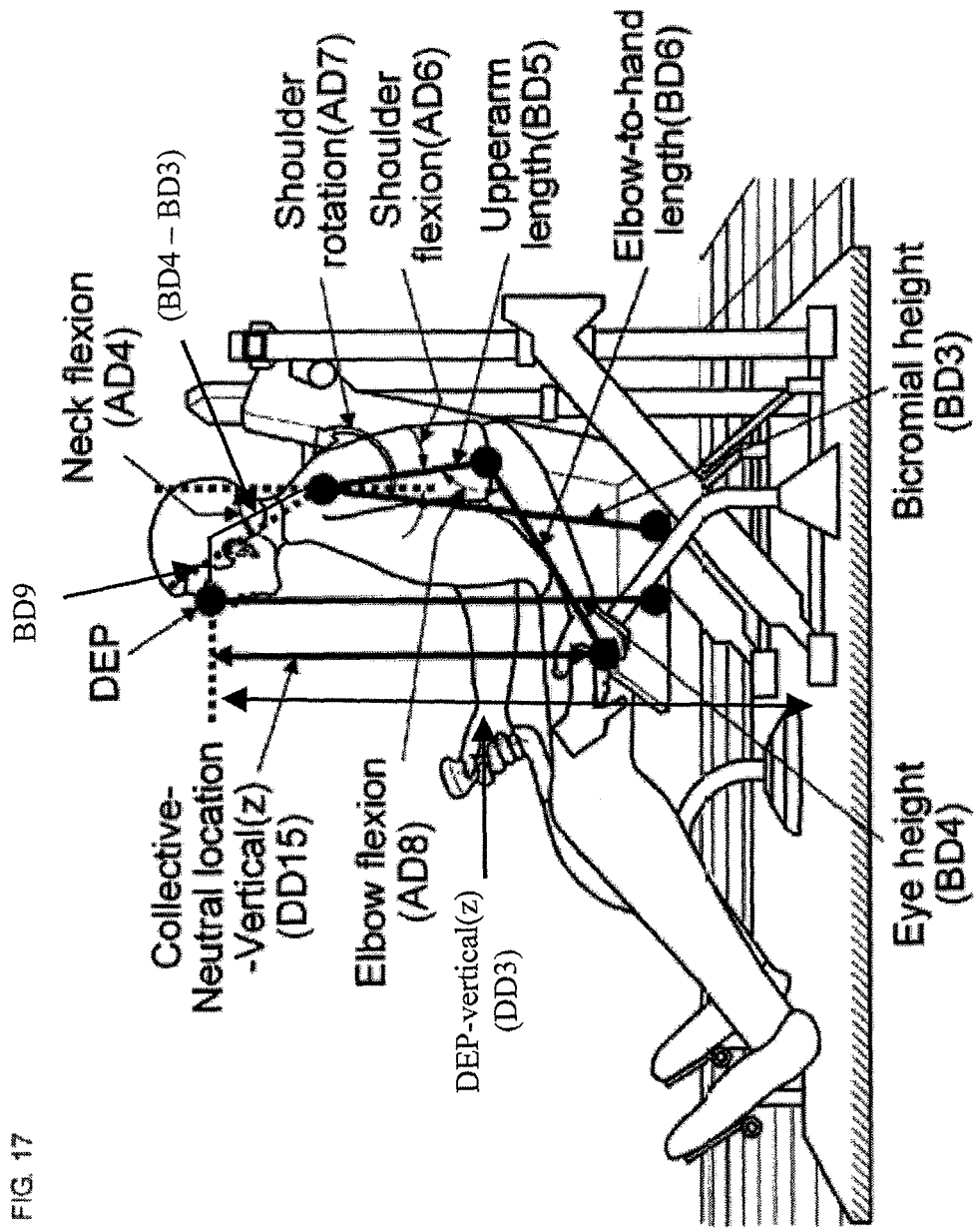

FIG. 17 is an exemplary drawing for obtaining a design equation for the vertical distance from the collective control to the DEP.

The vertical distance DD15 from the collective control to the DEP is related to human body variables such as the acromial height BD3 from the SRP to the shoulder, eye height BD4 from the SRP to the eye, upper arm length BD5, elbow-to-hand length BD6, neck flexion angle AD4, shoulder flexion AD6, shoulder abduction AD7, and elbow flexion AD8, and related design variables such as vertical distance DD3 from the DEP to the floor, and the pilot seat vertical adjustment range DD8.

The design equation for the vertical distance DD15 from the collective control to the DEP is Equation 10 below, where it is assumed that the collective control can be controlled when the pilot seat is moved within its vertical range.

$$DD15 = (BD4 - BD3) \times \cos(AD4) - BD5 \times \cos(AD6) \times \cos(AD7) - BD6 \times \cos(AD8 + AD6) \quad \text{Equation 10}$$

The design variables, related design variables, human body variables, and design dimensions in the design equation for the vertical distance DD15 from the collective control to the DEP are shown in Table 13 below.

TABLE 13

| Design Variable | | Collective Control-Neutral Location-Vertical (z) (DD15) |
|---|---|---|
| Description | | Vertical Distance from Collective Control to DEP |
| Design Principle | | Design for Average Person |
| Related Design Variables | | DEP-Vertical (z) (DD3) Seat-adjustment Range-Vertical (z) (DD8) |
| Human Body Variables | Human Body Dimensions | Acromial Height (BD3) Eye Height (BD4) Upper Arm Length (BD5) Elbow-to-hand Length (BD6) |
| | Human Body Angles | Neck Flexion Angle (AD4) Shoulder Flexion (AD6) Shoulder Abduction (AD7) Elbow Flexion (AD8) |
| Design Equation | | DD15 = DD3 − (BD4 − BD3) × cos(AD4) − BD5 × cos(AD6) × cos(AD7) − BD6 × cos(AD8 + AD6) |
| Design Dimension | | 398 mm |

In embodiments of the present invention, the above design equation is used, where the vertical distance DD15 from the cyclic control to the DEP is implemented as 398 mm.

X-Axis Horizontal Distance from Yaw Pedal to DEP

Figure 18:
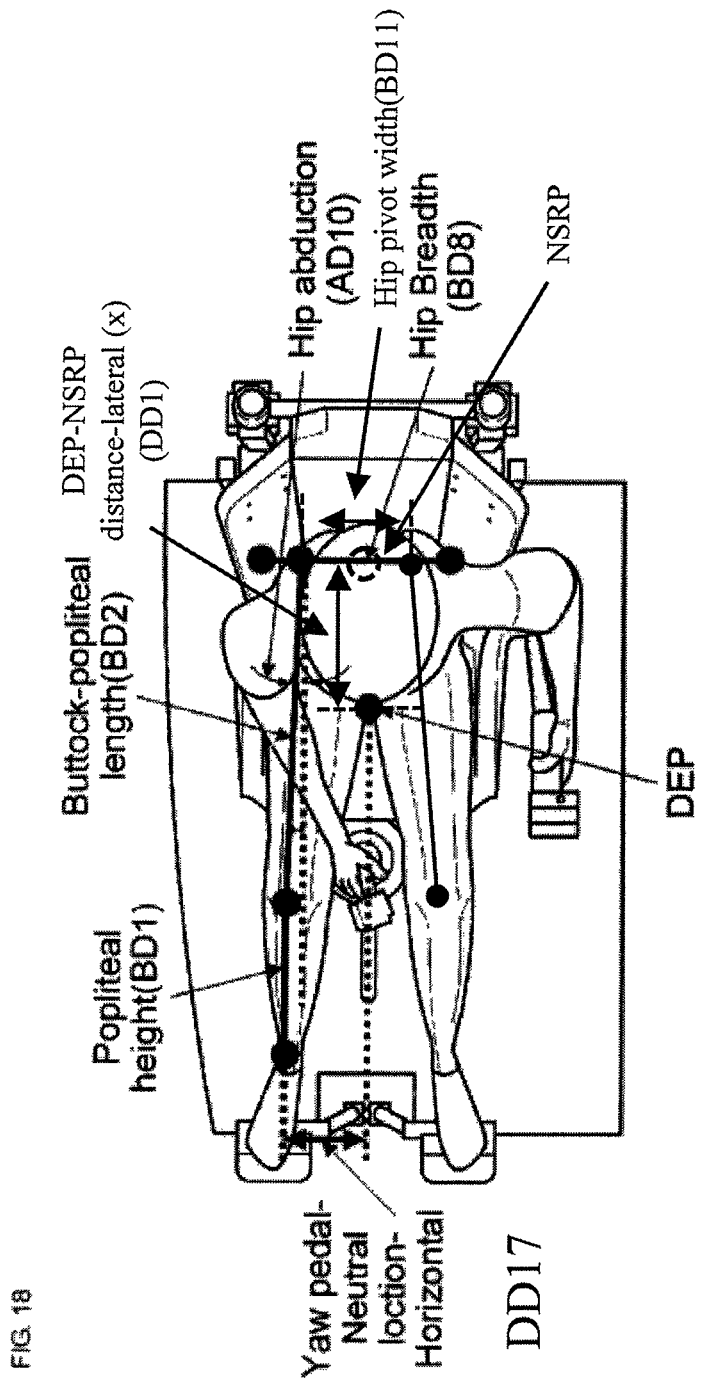
Figure 19:
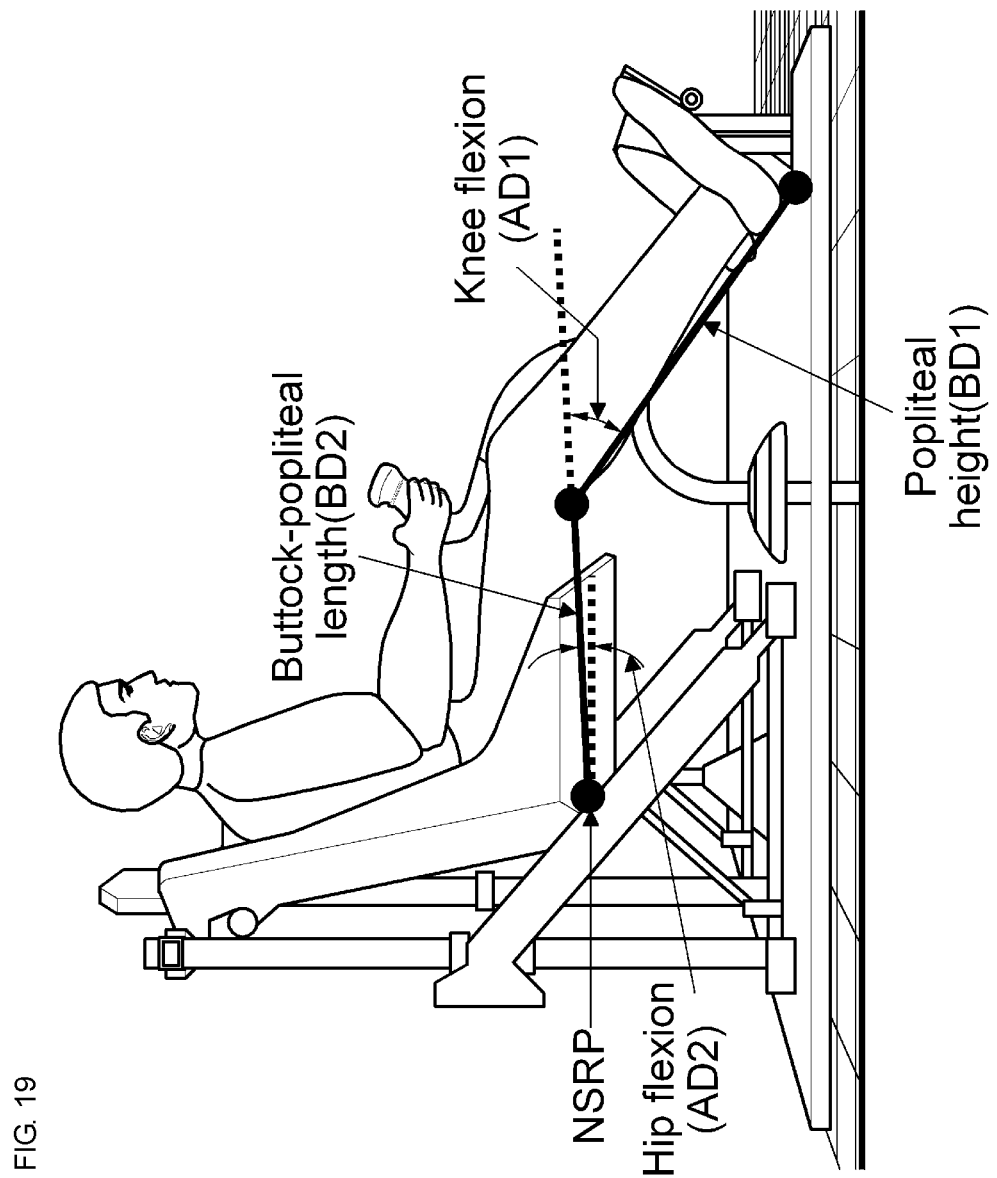

FIGS. 18 and 19 are exemplary drawings for obtaining a design equation for the horizontal distance of an x-axis from the yaw pedal to the DEP.

The x-axis horizontal distance from the yaw pedal to the DEP is related to human body variables such as height BD1 from the floor to the popliteus, length BD2 from the buttocks to the popliteus, hip pivot width BD11, knee flexion AD1, hip flexion AD2, and hip abduction AD10, and related design variables such as the x-axis horizontal distance DD1 from the DEP to the NSRP, and the seat pan angle, and Equation 11 below is the design equation thereof. Here, the seat pan angle may be 10°-20°, and the heel distance is assumed to be 25 mm.

$$DD17 = DD1 + BD11/2 + BD2 \times \sin(AD2) \times \sin(AD10) + (BD1 + 25) \times \sin(AD1) \times \sin(AD10) \quad \text{Equation 11}$$

The design variables, related design variables, human body variables, and design dimensions in the design equation for the x-axis horizontal distance DD17 from the yaw pedal to the DEP are shown in Table 14 below.

TABLE 14

| | | |
|---|---|---|
| Design Variable | | Yaw Pedal-Neutral Location-Lateral (x) (DD17) |
| Description | | X-axis Horizontal Distance from Yaw Pedal to DEP |
| Design Principle | | Design for Average Person |
| Related Design Variables | | DEP-Lateral (x) (DD1) |
| | | Seat Pan Angle: 10°-20° |
| Human Body Variables | Human Body Dimensions | Popliteal Distance (BD1) |
| | | Buttock-popliteus length (BD2) |
| | | Hip Pivot Width (BD11) |
| | Human Body Angles | Knee Flexion (AD1) |
| | | Hip Flexion (AD2) |
| | | Hip Abduction (AD10) |
| Design Equation | | DD17 = DD1 + BD11/2 + BD2 × sin(AD2) × sin(AD10) + (BD1 + 25) × sin(AD1) × sin(AD10) |
| Design Dimension | | 181 mm |

In embodiments of the present invention, the above design equation is used, where the x-axis horizontal distance DD17 from the yaw pedal to the DEP is implemented as 181 mm.

Y-Axis Horizontal Distance from Yaw Pedal to NSRP

Figure 20:
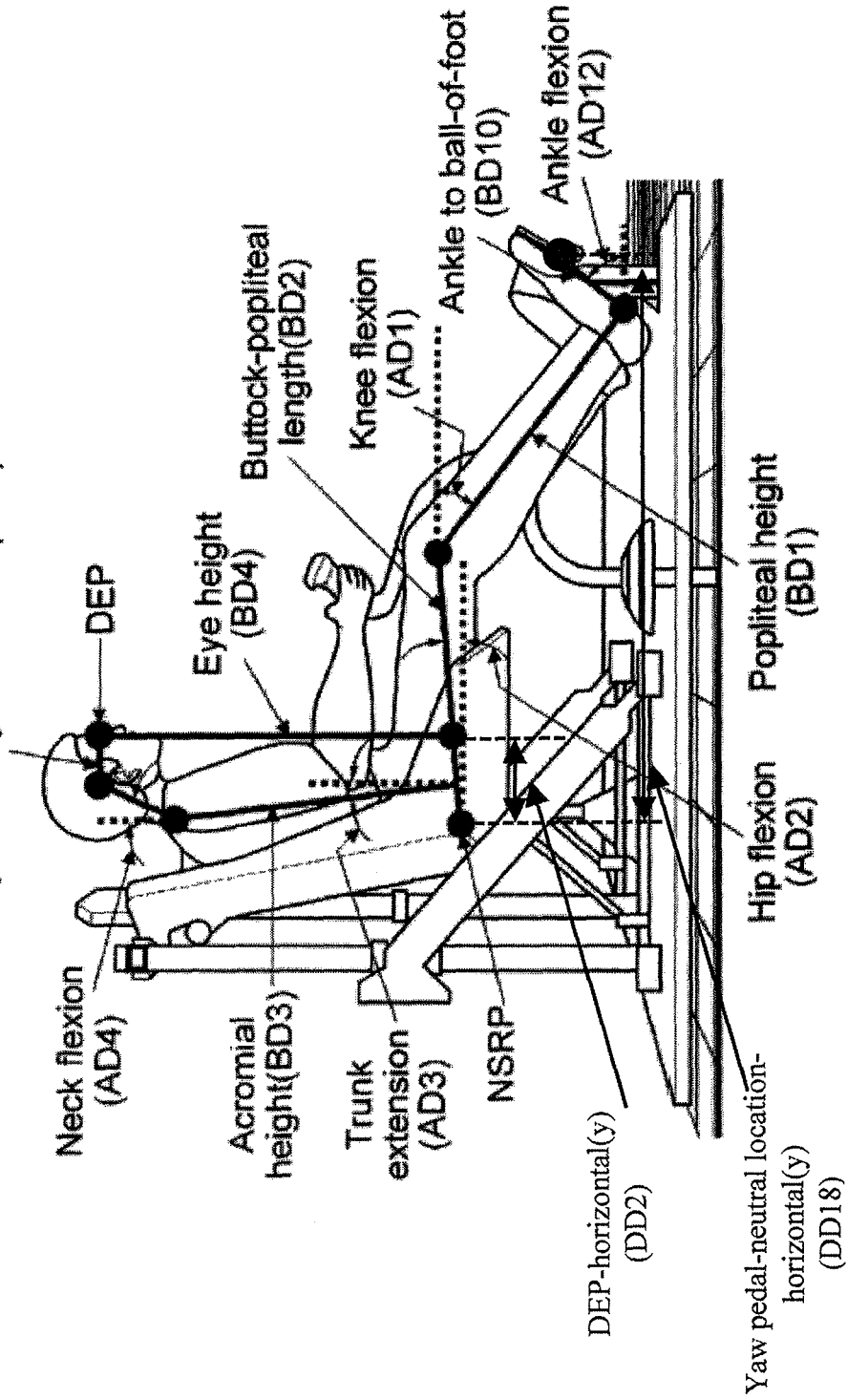

FIG. 20 is an exemplary drawing for obtaining a design equation for the horizontal distance of the y-axis from the yaw pedal to the NSRP.

The y-axis horizontal distance DD14 from the yaw pedal to the NSRP is related to human body variables such as height BD1 from the floor to the popliteus, length BD2 from the buttock to the popliteus, acromial height BD3 from the SRP to the shoulder, eye height BD4 from the SRP to the eye, eye-to-body-centerline distance BD9, distance from ankle to ball-of-foot BD10, knee flexion AD1, hip flexion AD2, seat-back angle AD3, neck flexion AD4, and hip abduction AD10, and related design variables such as the y-axis horizontal distance DD2 from the DEP to the NSRP, and the seat pan angle, and Equation 12 below is the design equation thereof. Here, the seat pan angle may be 10-20°, and it is assumed that the heel distance is 25 mm.

$$DD18 = DD2 - BD9 - (BD4 - BD3) \times \sin(AD4) + BD3 \times \sin(AD3) + BD2 \times \cos(AD2) \times \cos(AD10) + (BD1+25) \times \cos(AD1) \times \cos(AD2) + BD10 \quad \text{Equation 12}$$

The design variables, related design variables, human body variables, and design dimensions in the design equation for the y-axis horizontal distance DD18 from the yaw pedal to the NSRP are shown in Table 15 below.

TABLE 15

| | | |
|---|---|---|
| Design Variable | | Yaw Pedal-Neutral Location-Horizontal (y) (DD18) |
| Description | | Y-axis Horizontal Distance from Yaw Pedal to NSRP |
| Design Principle | | Design for Average Person |
| Related Design Variables | | DEP-Horizontal (y) (DD2) |
| | | Seat Pan Angle: 10°-20° |
| Human Body Variables | Human Body Dimensions | Popliteal Height (BD1) |
| | | Buttock-popliteus length (BD2) |
| | | Acromial Height (BD3) |
| | | Eye Height (BD4) |
| | | Eye-to-Body-Centerline Distance (BD9) |
| | | Ankle to Ball-of-foot (BD10) |
| | Human Body Angles | Knee Flexion (AD1) |
| | | Hip Flexion (AD2) |
| | | Trunk Extension (AD3) |
| | | Neck Flexion Angle (AD4) |
| | | Hip Abduction (AD10) |
| Design Equation | | DD14 = DD2 − BD9 − (BD4 − BD3) × sin(AD4) + BD3 × sin(AD3) + BD2 × cos(AD2) × cos(AD10) + (BD1 + 25) × cos(AD1) × cos(AD2) + BD10 |
| Design Dimension | | 880 mm |

In embodiments of the present invention, the above design equation is used, where the y-axis horizontal distance DD14 from the yaw pedal to the NSRP is implemented as 880 mm.

Z-Axis Vertical Distance from Yaw Pedal to Floor

Figure 21:
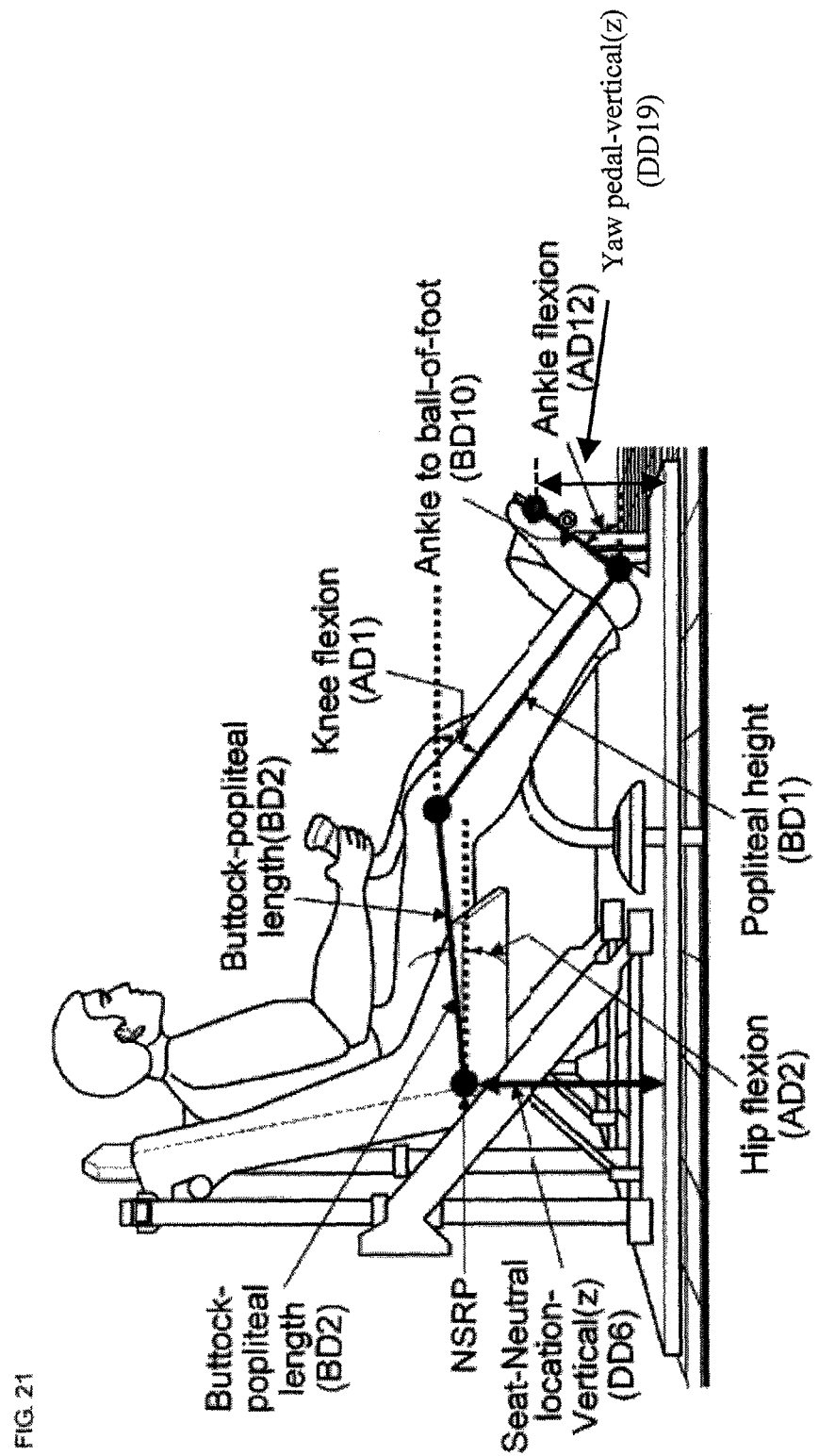

FIG. 21 is an exemplary drawing for obtaining a design equation for the vertical distance of the z-axis from the yaw pedal to the floor.

The z-axis vertical distance DD19 from the yaw pedal to the floor is related to human body variables such as height BD1 from the floor to the popliteus, length BD2 from the buttock to the popliteus, distance from ankle to ball-of-foot BD10, knee flexion AD1, hip flexion AD2, and ankle flexion AD12, and related design variables such as z-axis vertical distance DD6 from the floor to the NSRP, and Equation 13 below is the design equation thereof. Here, the heel distance is assumed to be 25 mm.

$$DD19 = DD6 + BD2 \times \sin(AD2) - BD1 \times \sin(AD1) + BD10 \times \sin(AD12) + 25 \quad \text{Equation 13}$$

The design variables, related design variables, human body variables, and design dimensions in the design equation for the z-axis vertical distance DD19 from the yaw pedal to the floor are shown in Table 16 below.

TABLE 16

| | | |
|---|---|---|
| Design Variable | | Yaw Pedal-Neutral Location-Vertical (z) (DD19) |
| Description | | Z-axis Vertical Distance from Yaw Pedal to Floor |
| Design Principle | | Design for Average Person |
| Related Design Variables | | Z-axis Vertical Distance (DD6) from Floor to NSRP |
| Human Body Variables | Human Body Dimensions | Popliteal Height (BD1) |
| | | Buttock-popliteus length (BD2) |
| | Human Body Angles | Knee Flexion (AD1) |
| | | Hip Flexion (AD2) |
| Design Equation | | DD19 = DD2 − (BD4 − BD3) × sin(AD4) + BD3 × sin(AD3) + BD2 × cos(AD2) + (BD1 + 25) × cos(AD1) |
| Design Dimension | | 127 mm |

In embodiments of the present invention, the z-axis vertical distance from the yaw pedal to the floor is implemented as 127 mm.

While a helicopter pilot seat of Korean specifications has been exemplarily described in the anthropometric product design method of the present invention, all components (products) including the cyclic and collective controls and pedals may be designed through computer simulations using design sensitivity analysis as anthropometrically suitable products for users.

Thus, by running a computer simulation of postures according to changes in product design dimensions, and then conducting a design sensitivity analysis to design an anthropometrically suitable product for users, the anthropometric product design method of the present invention can overcome technical limitations to achieve its objectives.

An anthropometric product design method and a recording media storing a computer program for the same in accordance with the present invention have been implemented to suit an anthropometric design for Korean helicopter specifications, and can be applied to the development of an anthropometric product design optimization system to which the anthropometric design method is applied and commercialized. In particular, the anthropometric optimization system may be developed as a stand-alone product, or may be developed as a design optimization module to be installed in a plug-in format.

Also, an anthropometric product design method and a recording media storing a computer program for the same in accordance with the present invention can be applied not only to helicopters, but also to other types of aircraft, automobiles, and any other fields in which anthropometric products are designed.

According to the anthropometric product design method and a recording media storing a computer program for the same in accordance with the present invention, because various human body dimensions and product use postures of users can be reflected in product designs through computer simulations, products that are better customized for users can be designed.

Also, an optimized product can be designed by analyzing a posture loss score according to design dimensional changes through design sensitivity analysis.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An anthropometric product design method, comprising:
   (a) performing a design structure matrix analysis using a design structure matrix that expresses relationships between human body variables and design variables of a product to be designed, and developing design equations for the design variables based on the design structure matrix analysis;
   (b) generating by a computer a virtual representative human model (RHM) based on at least one person demographically representative of a design target population for the product to be designed;
   (c) performing automatically by a computer a design sensitivity analysis by extrapolating data for postures according to changes in design dimensions through computer simulation using the design equations and the virtual representative human model, and comparing the extrapolated data for the postures with reference posture data; and
   (d) based on the design sensitivity analysis, determining automatically by the computer optimal design dimensions for design variables related to the design variables.

2. The anthropometric product design method of claim 1, wherein the human body variables comprise human body part variables and posture variables.

3. The anthropometric product design method of claim 1, wherein the extrapolating of postures according to changes in the design dimensions in operation (c) comprises extrapolating postures of the RHM for the product to be designed, through running a simulation in which dimensions of the product are changed within a designable range while substituting human body dimensions of the RHM into the design equations.

4. The anthropometric product design method of claim 1, wherein the performing of the design sensitivity analysis in operation (c) comprises comparing the extrapolated posture data with the defined reference posture data to calculate a posture loss score, and performing the design sensitivity analysis based on the calculated posture loss score.

5. The anthropometric product design method of claim 4, wherein the calculating of the posture loss score in operation (c) comprises substituting the extrapolated posture data in a posture loss function that converts the posture of the RHM to a posture loss score, and performing a calculation.

6. The anthropometric product design method of claim 5, wherein the posture loss function satisfies the expression:

posture loss score=slope×|values of RHM posture variables−values of reference posture variables|, wherein values of a target posture variables threshold are between the values of reference posture variables and values of maximum extension posture variables, and the slope between the values of comfortable posture variables threshold and the values of reference posture variables is lower than the slope between the values of comfortable posture variables threshold and the values of maximum extension posture variables, wherein values within the target posture variables threshold yield a product that avoids causing discomfort to a user due to the user's posture when using the product.

7. The anthropometric product design method of claim 5, wherein the posture loss function has a first slope within a defined reference posture threshold range, and has a second slope outside the defined reference posture threshold range, the first slope being smaller than the second slope.

8. The anthropometric product design method of claim 1, wherein the determining of the optimal design dimensions in operation (d) comprises determining a loss score of the RHM that is a minimum value, based on the design sensitivity analysis, as optimal design dimensions of related design variables.

9. The anthropometric product design method of claim 1, wherein a design equation for the vertical height (DD6) from the seat reference point (SRP) to the floor is $$DD6 = BD1 \times \sin(AD1) - BD2 \times \sin(\text{Seatpan angle}) + 25,$$

where BD1 is the height from the floor to the popliteus, AD1 is a knee flexion angle, BD2 is the length from the buttock to the popliteus, the seatpan angle ranges from 10° to 20°, and 25 is a heel height in millimeters.

10. The anthropometric product design method of claim 1, wherein a design equation for the y-axis horizontal distance (DD2) from a design eye point (DEP) to a neutral seat reference point (NSRP) is $$DD2 = 110 - BD3 \times \sin(AD3) + (BD4 - BD3) \times \sin(AD4) + BD9,$$

where 110 is the horizontal distance between the NSRP and HP, BD3 is the acromial height from SRP to the shoulder, AD3 is a seatback angle, BD4 is the eye height from the SRP to the eye, AD4 is a neck flexion angle, and BD9 is the distance between the eye and the body centerline.

11. The anthropometric product design method of claim 1, wherein a design equation for the vertical distance (DD3) from the DEP to the floor is $$DD3 = DD6 + BD3 \times \cos(AD3) + (BD4 - BD3) \times \cos(AD4),$$

where DD6 is the vertical height from SRP to the floor, BD3 is the height from SRP to the shoulder, AD3 is a seatback angle, BD4 is the eye height from the SRP to the eye, and AD4 is a neck flexion angle.

12. The anthropometric product design method of claim 1, wherein a design equation for the horizontal adjustment range of the pilot seat (DD7) is $$DD7 = 110 - \{DD2 - (BD4 - BD3) \times \sin(AD4) + BD3 \times \sin(AD3)\} + BD9,$$

where 110 is the horizontal distance from NSRP to heel point (HP), DD2 is the y-axis horizontal distance from DEP to the NSRP, BD4 is the eye height from the seat to the eye, BD3 is the acromial height from SRP to the shoulder, AD3 is a seatback angle, and BD9 is the distance between the eye and the body centerline.

13. The anthropometric product design method of claim 1, wherein a design equation for the pilot seat vertical adjustment range (DD8) is $$DD8 = DD3 - (BD4 - BD3) \times \cos(AD4) - BD3 \times \cos(AD3) - DD6,$$

where DD3 is the vertical distance from DEP to the floor, BD4 is the eye height from SRP to the eye, BD3 is the acromial height from the SRP to the shoulder, AD4 is a neck flexion angle, AD3 is a seatback angle, and DD6 is the vertical height from the SRP to the floor.

14. The anthropometric product design method of claim 1, wherein a design equation for the y-axis horizontal distance (DD10) from the cyclic control to NSRP is $$DD10=DD2-BD9-(BD4-BD3)\times\sin(AD4)+BD5\times\sin(AD6)+BD6\times\cos(AD9)\times\cos(AD8+AD6)\times\cos(AD9),$$

where DD2 is the y-axis horizontal distance from DEP to the NSRP, BD9 is the distance between the eye and the body centerline, BD4 is the eye height from the SRP to the eye, BD3 is the acromial height from the SRP to the shoulder, AD4 is a neck flexion angle, BD5 is the upper arm length, AD6 is shoulder flexion, BD6 is an elbow-to-hand length, AD9 is shoulder rotation, and AD8 is elbow flexion.

15. The anthropometric product design method of claim 1, wherein a design equation for the vertical distance (DD11) from the cyclic control to the floor is $$DD11=DD3-(BD4-BD3)\times\cos(AD4)-BD5\times\cos(AD6)\times\cos(AD7)-BD6\times\cos(AD8+AD6),$$

where DD3 is the vertical distance from DEP to the floor, BD4 is an eye height from an SRP to the eye, BD3 is an acromial height from the SRP to shoulder, AD4 is a neck flexion angle, BD5 is an upper arm length, AD6 is a shoulder flexion angle, AD7 is a shoulder abduction angle, BD6 is an elbow-to-hand length, and AD8 is an elbow flexion angle.

16. The anthropometric product design method of claim 1, wherein a design equation for an x-axis horizontal distance (DD13) from the collective control to DEP is $$DD13=BD7/2+BD5\times\sin(AD7)-BD6\times\sin(AD9),$$

where BD7 is a biacromial breadth, BD5 is an upper arm length, AD7 is a shoulder abduction angle, BD6 is an elbow-to-hand length, and AD9 is a shoulder rotation angle.

17. The anthropometric product design method of claim 1, wherein a design equation for the y-axis horizontal distance (DD14) from the collective control to DEP is $$DD14=BD9-(BD4-BD3)\times\sin(AD4)+BD5\times\sin(AD6)+BD6\times\cos(AD8+AD6)\times\cos(AD9),$$

where DD2 is the y-axis horizontal distance from the DEP to a side, BD9 is an eye-to-body-centerline distance, BD4 is an eye height from an SRP to the eye, BD3 is an acromial height from the SRP to shoulder, AD4 is a neck flexion angle, BD5 is an upper arm length, AD6 is a shoulder flexion angle, BD6 is an elbow-to-hand length, AD8 is an elbow flexion angle, and AD9 is a shoulder rotation angle.

18. The anthropometric product design method of claim 1, wherein a design equation for the vertical distance (DD15) from the collective control to DEP is $$DD15=(BD4-BD3)\times\cos(AD4)-BD5\times\cos(AD6)\times\cos(AD7)-BD6\times\cos(AD8+AD6),$$

where DD3 is the vertical distance from the DEP to the floor, BD4 is an eye height from SRP to the eye, BD3 is an acromial height from the SRP to shoulder, AD4 is a neck flexion angle, BD5 is an upper arm length, AD6 is a shoulder flexion angle, AD7 is a shoulder abduction angle, BD6 is an elbow-to-hand length, and AD8 is an elbow flexion angle.

19. The anthropometric product design method of claim 1, wherein a design equation for an x-axis horizontal distance (DD17) from the yaw pedal to DEP is $$DD17=DD1+BD11/2+BD2\times\sin(AD2)\times\sin(AD10)+(BD1+25)\times\sin(AD1)\times\sin(AD10),$$

where DD1 is the y-axis horizontal distance from the DEP to NSRP, BD11 is a hip pivot width, BD2 is the length from the buttock to the popliteus, AD2 is a hip flexion angle, AD10 is a hip abduction angle, BD1 is the height from the floor to the popliteus, and AD1 is a knee flexion angle.

20. The anthropometric product design method of claim 1, wherein a design equation for the z-axis vertical distance from the yaw pedal to the floor is $$DD19=DD6+BD2\times\sin(AD2)-BD1\times\sin(AD1)+BD10\times\sin(AD12)+25,$$

where DD6 is the z-axis vertical distance from the floor to NSRP, BD2 is the length from the buttock to the popliteus, AD2 is a hip flexion angle, BD1 is the height from the floor to the popliteus, AD1 is a knee flexion angle, BD10 is the distance between the ankle to the ball-of-foot, and AD12 is an ankle flexion angle.

21. A non-transitory computer readable medium product storing a computer program embedded in the recording medium product, the computer program comprising instructions configured to cause a computer to perform the anthropometric product design method of claim 1.

* * * * *